(12) United States Patent
Kashiwa

(10) Patent No.: US 7,456,875 B2
(45) Date of Patent: Nov. 25, 2008

(54) IMAGE PICKUP APPARATUS AND METHOD, SIGNAL PROCESSING APPARATUS AND METHOD, AND WEARABLE SIGNAL PROCESSING APPARATUS

(75) Inventor: Kotaro Kashiwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 887 days.

(21) Appl. No.: 10/386,892

(22) Filed: Mar. 12, 2003

(65) Prior Publication Data

US 2003/0215010 A1 Nov. 20, 2003

(30) Foreign Application Priority Data

Mar. 14, 2002 (JP) ............... 2002-070286
Mar. 14, 2002 (JP) ............... 2002-070287
Mar. 14, 2002 (JP) ............... 2002-070288

(51) Int. Cl.
*H04N 5/225* (2006.01)

(52) U.S. Cl. .................. 348/239; 348/207.99

(58) Field of Classification Search ............ 348/373, 348/375, 376, 14.08, 14.12, 14.09, 14.1, 348/222.1, 239; 382/103; 358/906, 909.1
See application file for complete search history.

(56) References Cited

U.S. PATENT DOCUMENTS

| 5,014,079 | A | * | 5/1991 | Hoshino et al. ............... 396/59 |
| 5,689,442 | A | | 11/1997 | Swanson et al. |
| 5,808,663 | A | * | 9/1998 | Okaya ...................... 348/14.1 |
| 6,104,705 | A | * | 8/2000 | Ismail et al. ................. 370/260 |
| 6,201,562 | B1 | * | 3/2001 | Lor .......................... 348/14.01 |
| 6,360,003 | B1 | * | 3/2002 | Doi et al. ..................... 382/107 |
| 6,681,120 | B1 | * | 1/2004 | Kim, II ..................... 455/556.1 |
| 6,934,461 | B1 | * | 8/2005 | Strub et al. .................. 386/46 |
| 7,133,537 | B1 | * | 11/2006 | Reid .......................... 382/103 |
| 2003/0174773 | A1 | * | 9/2003 | Comaniciu et al. ..... 375/240.08 |

FOREIGN PATENT DOCUMENTS

| EP | 0 522 204 | 1/1993 |
| EP | 0 949 818 | 10/1999 |
| EP | 1 134 718 | 9/2001 |

(Continued)

OTHER PUBLICATIONS

Patent Abstracts of Japan vol. 1997, No. 05, May 30, 1997 & JP 09 023418 A (Hitachi Denshi Ltd), Jan. 21, 1997.

*Primary Examiner*—Tuan V Ho
(74) *Attorney, Agent, or Firm*—Frommer Lawrence & Haug LLP; William S. Frommer; Thomas F. Presson

(57) ABSTRACT

The present invention is directed to an image pickup method and apparatus. The image pickup apparatus may include a video signal generating device that generates video signals in a first direction and a second direction and a signal processing device that changes one of a frame rate and a compression rate of the video signals in the first and second direction. The apparatus may further include a detection device for detecting that a state of the apparatus matches a predetermined condition for changing the frame rate and/or compression rate of the video signal and a controller for controlling the signal processing device so as to change the frame rate and/or compression rate of the video signals in the first and/or the second direction on the basis of the detected condition.

21 Claims, 13 Drawing Sheets

FOREIGN PATENT DOCUMENTS

| | | |
|---|---|---|
| GB | 2 374 222 | 10/2002 |
| JP | 8-181912 | 7/1996 |
| JP | 10 121413 | 5/1998 |
| JP | 11 167770 | 6/1999 |
| JP | 11 187383 | 7/1999 |
| JP | 11 298853 | 10/1999 |
| JP | 11-298869 | 10/1999 |
| JP | 11 306494 | 11/1999 |
| JP | 11 308587 | 11/1999 |
| JP | 11 341326 | 12/1999 |
| JP | 2000 151710 | 5/2000 |
| JP | 2000-333160 | 11/2000 |
| JP | 2001 126173 | 5/2001 |
| JP | 2001 145089 | 5/2001 |
| JP | 2001 211414 | 8/2001 |
| JP | 2001 211450 | 8/2001 |
| JP | 2001 292439 | 10/2001 |
| JP | 2001 309284 | 11/2001 |
| JP | 2002 44647 | 2/2002 |
| JP | 2002 64789 | 2/2002 |
| WO | WO 00 70486 | 11/2000 |
| WO | WO 01 76233 | 10/2001 |
| WO | WO 02 13522 | 2/2002 |

* cited by examiner

F I G. 6

| | STORAGE MODE | TRANSMISSION MODE | MULTI-MODE (STORAGE+TRANSMISSION) |
|---|---|---|---|
| NORMAL RATE | RECORD VIDEO DATA FROM FRONT CAMERA AND VIDEO DATA FROM REAR CAMERA AT THE SAME FRAME RATE AND AT THE SAME COMPRESSION RATE | TRANSMIT VIDEO DATA FROM FRONT CAMERA AND VIDEO DATA FROM REAR CAMERA AT THE SAME FRAME RATE AND AT THE SAME COMPRESSION RATE | RECORD AND TRANSMIT VIDEO DATA FROM FRONT CAMERA AND VIDEO DATA FROM REAR CAMERA AT THE SAME FRAME RATE AND AT THE SAME COMPRESSION RATE |
| FRONT PRIORITY RATE | RECORD VIDEO DATA FROM FRONT CAMERA AT HIGH FRAME RATE AND AT LOW COMPRESSION RATE | TRANSMIT VIDEO DATA FROM FRONT CAMERA AT HIGH FRAME RATE AND AT LOW COMPRESSION RATE | RECORD AND TRANSMIT VIDEO DATA FROM FRONT CAMERA AT HIGH FRAME RATE AND AT LOW COMPRESSION RATE |
| REAR PRIORITY RATE | RECORD VIDEO DATA FROM REAR CAMERA AT HIGH FRAME RATE AND AT LOW COMPRESSION RATE | TRANSMIT VIDEO DATA FROM REAR CAMERA AT HIGH FRAME RATE AND AT LOW COMPRESSION RATE | RECORD AND TRANSMIT VIDEO DATA FROM REAR CAMERA AT HIGH FRAME RATE AND AT LOW COMPRESSION RATE |

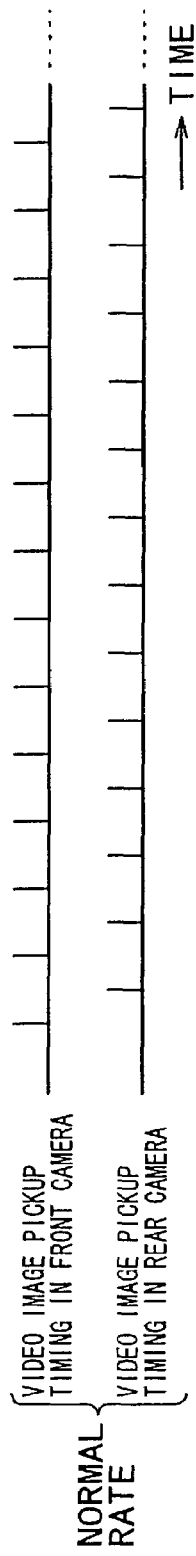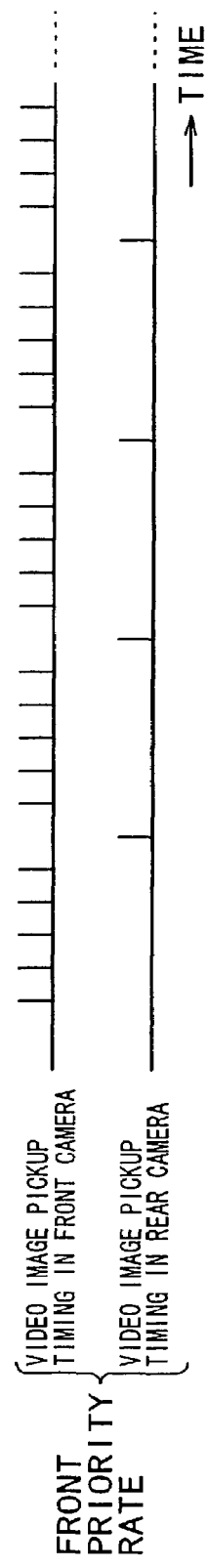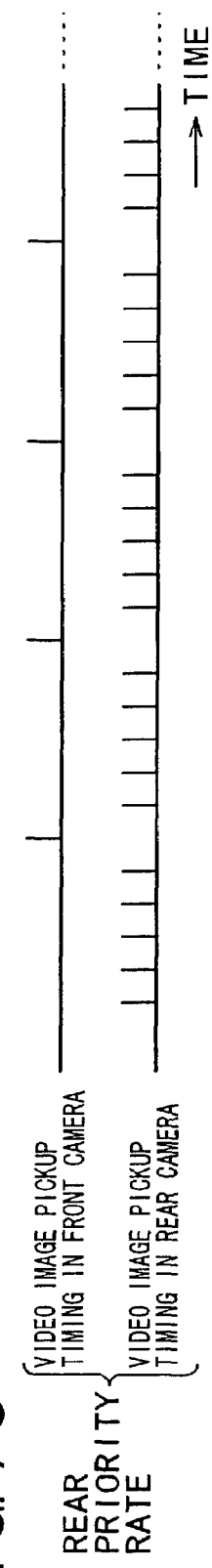

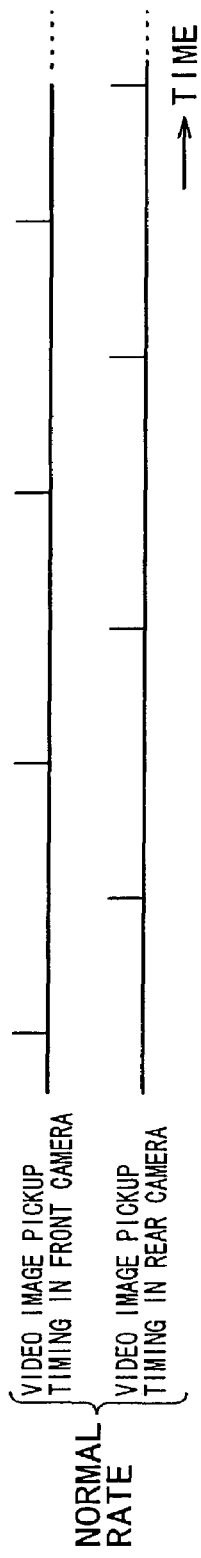
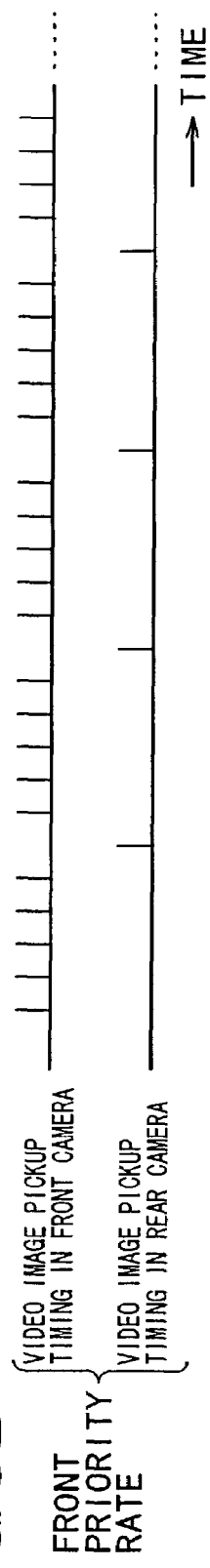
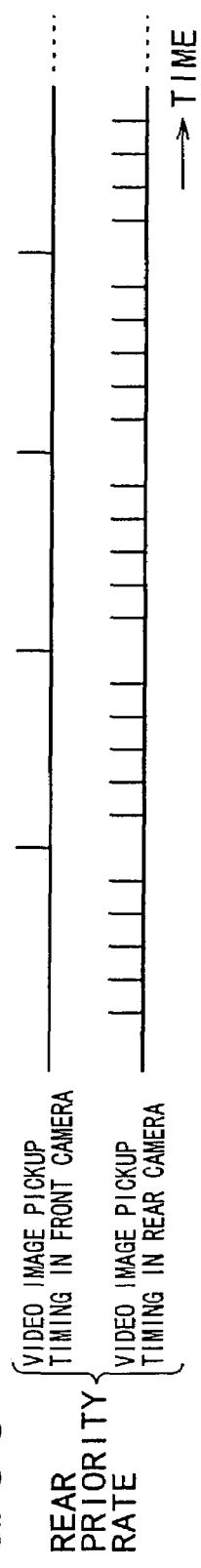

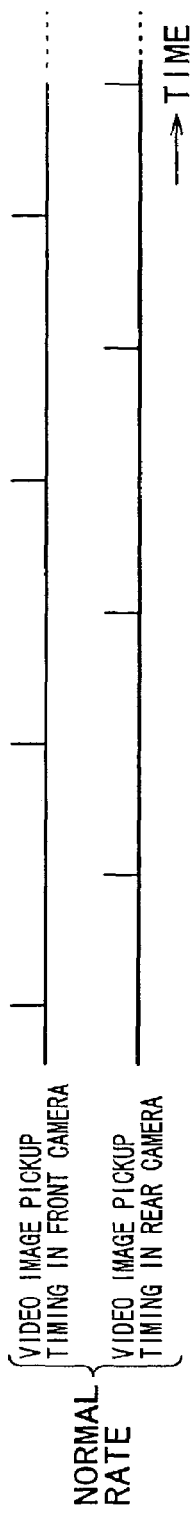
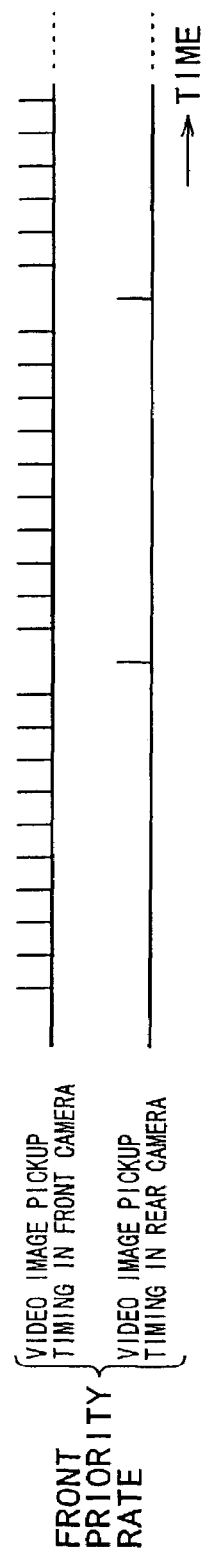
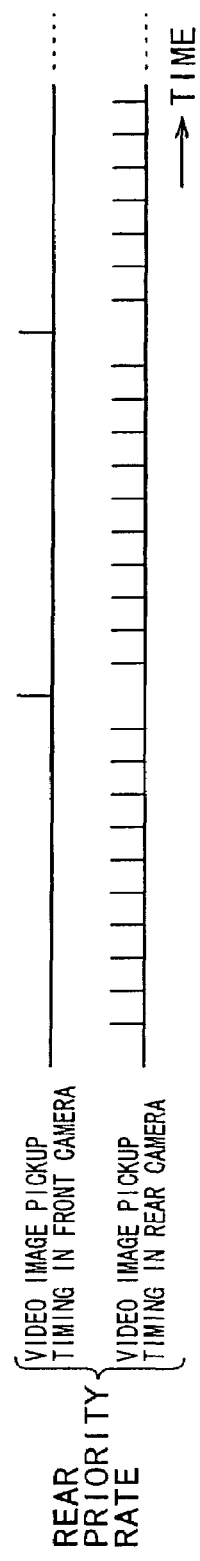

F I G. 10

| | | FRONT PRIORITY RATE | REAR PRIORITY RATE | |
|---|---|---|---|---|
| ASPECT OF FRAME RATE CONTROL | NORMAL MODE RATE IS MAINTAINED AS TOTAL RATE | FRONT FRAME RATE IS INCREASED REAR FRAME RATE IS REDUCED | FRONT FRAME RATE IS REDUCED REAR FRAME RATE IS INCREASED | f1 |
| | TOTAL RATE IS HIGHER THAN NORMAL MODE RATE | FRONT FRAME RATE IS INCREASED REAR FRAME RATE IS NOT CHANGED | FRONT FRAME RATE IS NOT CHANGED REAR FRAME RATE IS INCREASED | f2 |
| | | FRONT AND REAR FRAME RATES ARE INCREASED FRONT RATE > REAR RATE | FRONT AND REAR FRAME RATES ARE INCREASED FRONT RATE < REAR RATE | f3 |
| | | FRONT FRAME RATE IS GREATLY INCREASED REAR FRAME RATE IS REDUCED | FRONT FRAME RATE IS REDUCED REAR FRAME RATE IS GREATLY INCREASED | f4 |
| | TOTAL RATE IS LOWER THAN NORMAL MODE RATE | FRONT FRAME RATE IS NOT CHANGED REAR FRAME RATE IS REDUCED | FRONT FRAME RATE IS REDUCED REAR FRAME RATE IS NOT CHANGED | f5 |
| | | FRONT AND REAR FRAME RATES ARE REDUCED FRONT RATE > REAR RATE | FRONT AND REAR FRAME RATES ARE REDUCED FRONT RATE < REAR RATE | f6 |
| | | FRONT FRAME RATE IS REDUCED REAR FRAME RATE IS GREATLY REDUCED | FRONT FRAME RATE IS GREATLY REDUCED REAR FRAME RATE IS REDUCED | f7 |
| ASPECT OF COMPRESSION RATE CONTROL | | FRONT COMPRESSION RATE IS REDUCED REAR COMPRESSION RATE IS INCREASED | FRONT COMPRESSION RATE IS INCREASED REAR COMPRESSION RATE IS REDUCED | m1 |
| | | FRONT COMPRESSION RATE IS REDUCED REAR COMPRESSION RATE IS NOT CHANGED | FRONT COMPRESSION RATE IS NOT CHANGED REAR COMPRESSION RATE IS REDUCED | m2 |
| | | FRONT COMPRESSION RATE IS NOT CHANGED REAR COMPRESSION RATE IS INCREASED | FRONT COMPRESSION RATE IS INCREASED REAR COMPRESSION RATE IS NOT CHANGED | m3 |
| | | FRONT COMPRESSION RATE IS GREATLY REDUCED REAR COMPRESSION RATE IS REDUCED | FRONT COMPRESSION RATE IS REDUCED REAR COMPRESSION RATE IS GREATLY REDUCED | m4 |
| | | FRONT COMPRESSION RATE IS INCREASED REAR COMPRESSION RATE IS GREATLY INCREASED | FRONT COMPRESSION RATE IS GREATLY INCREASED REAR COMPRESSION RATE IS INCREASED | m5 |

IMAGE PICKUP APPARATUS AND METHOD, SIGNAL PROCESSING APPARATUS AND METHOD, AND WEARABLE SIGNAL PROCESSING APPARATUS

BACKGROUND OF THE INVENTION

The present invention relates to an image pickup apparatus and method for picking up video and sound in many directions. The image pickup apparatus can be used "hands-free" so that a user may pay attention to matters other than picking up images.

An image pickup apparatus such as a portable video camera or the like has many commercial and residential uses. For example, in ordinary households, it can be utilized for capturing and recording events such as an athletic competition or stages in a child's growth. In commercial areas, the video camera can be used for monitoring/security purposes. However, in such instances, a surveillance camera that is fixed to a permanent position is utilized. In many instances, a user can not concentrate on performing image pickup to record an event relate to work when the user is working. For example, although a security guard may be able to carry a portable video camera, its use may interfere with the security guard's duty. That is, the security guard or police officer can not effectively pay attention to his surroundings while concentrating on performing the image pickup operation. Accordingly, security guards and police officers do not carry video cameras while on patrol. However, the use of a video camera during patrol may be effective.

Further, a desired scene or a scene which deserves recording may not lie in a direction for image pickup. Such situation may occur when a user is unable to pay much attention to the image as, for example, during patrol type work, wherein image pickup may not be easily performed.

Accordingly, an image pickup apparatus that does not require the user's concentration as to its operation would be desirable.

SUMMARY OF THE INVENTION

The present invention enables high quality images to be obtained in appropriate directions, even if the user does not concentrate on the image pickup operation.

Accordingly, the present invention provides an image pickup apparatus comprising a video signal generating device for generating video signals in a first direction and a second direction, a signal processing device for changing a frame rate of the video signals in the first and the second direction, a detection device for detecting that a state of the apparatus matches a predetermined condition for changing the frame rate of the video signals, and a controlling device for controlling the signal processing device so as to change the frame rate of the video signals in the first and/or the second direction on the basis of the predetermined condition corresponding to the state of the apparatus detected by the detection device.

Furthermore, the present invention provides a signal processing apparatus and method for processing a video signal comprising, a generating device, having bi-directional image pickup devices, for shooting scenes in a first direction and a second direction and for generating a first video signal and a second video signal respectively corresponding to the scenes of the first and second directions, a compression device, connected to the generating device, for receiving the first and second video signals and for performing a compression process on the first and second source video signals with variable compression rates to generate a first compressed video signal and a second compressed video signal, a transmitting device for transmitting the first and second compressed video signals with variable transmission rates, a detecting device for detecting an event in a shooting position to generate a detection signal indicating at least a direction in which the event occurred, and a controlling device for controlling the variable compression rates and the variable transmission rates in response to said detection signal such that the video signal corresponding to the detection has priority.

In addition, the present invention provides a wearable signal processing apparatus comprising, an image pickup device for generating a source video signal, a signal processing device, connected to said image pickup device, for receiving said source video signal and for performing image compression on the source video signal to generate compressed video signal with variable compression rates, a recording device for recording said compressed video signal on the recording media with variable frame rates, and a mounting device for mounting the image pickup device, signal processing device and recording device on the cloth of the operator, whereby the devices are worn by the mounting device.

BRIEF DESCRIPTION OF THE DRAWINGS

FIG. 6 is an explanatory view of an operation mode and rate change of the video camera of FIG. 1;

FIGS. 7(A) to 7(C) are explanatory views of the frame rate change in the video camera of FIG. 1;

FIGS. 8(A) to 8(C) are explanatory views of the frame rate change in the video camera of FIG. 1;

FIGS. 9(A) to 9(C) are explanatory views of the frame rate change in the video camera of FIG. 1;

FIG. 10 is an explanatory view of various examples of rate change;

DETAILED DESCRIPTION OF THE INVENTION

Figure 1:
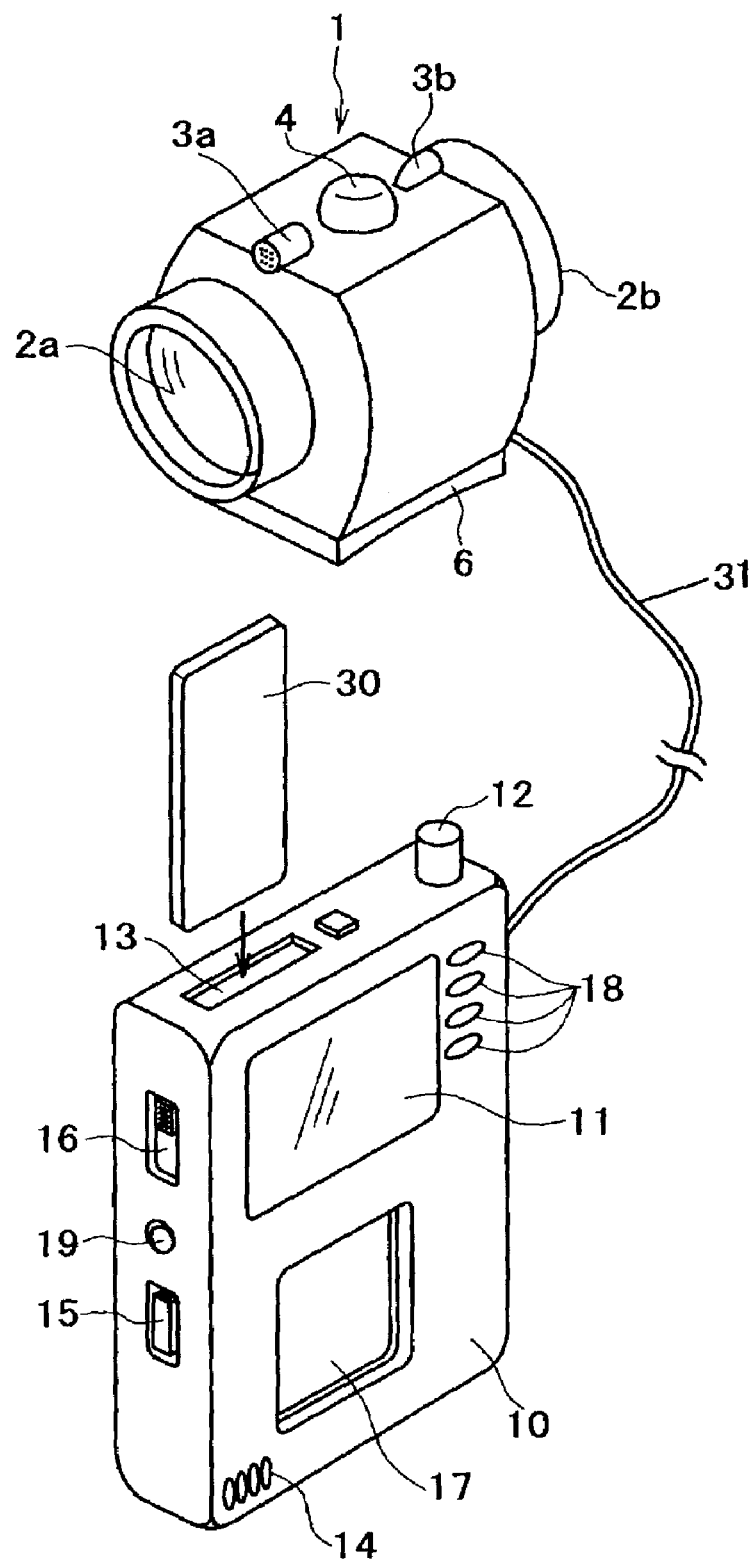
FIG. 1 is an explanatory view of outer appearance of a video camera according to an embodiment of the present invention.
Figure 2:
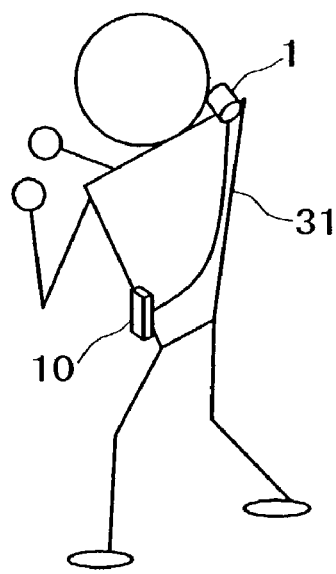
FIG. 2 is an explanatory view of the use of the video camera of FIG. 1.

Hereinbelow, a video camera according to the present invention will be described in the following order.
1. Aspect of Video Camera and System Configuration
2. Construction of Video Camera
3. Image Pickup Operation Mode
4. Rate Change by Operation or Instruction
5. Rate Change by Sound Check
6. Rate Change by Image Analysis
7. Rate Change by Position Detection 8. Modification 1. Aspect of Video Camera and System Configuration FIG. 1 shows an external appearance of a video camera according to an embodiment of the present invention. The video camera has a camera unit 1 and a control unit 10. The camera unit 1 and the control unit 10 are interconnected via a cable 31 such that signal transmission can be performed therebetween. As shown in FIG. 2, the camera unit 1 can be attached to a user's shoulder. On the other hand, the control unit 10 can be attached or held around the user's hip or in a pocket of his/her clothing, such that the user can perform "hands free" image pickup while carrying the camera.

Various ways to attach the camera unit 1 to the shoulder can be utilized. For example, a mechanism to hold a base unit 6 of the camera unit 1 may be formed on the user's clothing (jacket or the like for security guard duty), or the camera unit may be attached to the shoulder by using a harness belt or the like. In addition, the camera unit 1 may be fixed to an upper part or a side portion of a helmet which the user wears, or may be attached to the user's breast or arm. The shoulder is a part in which swinging is normally at a minimum even when the user is walking, therefore, it is an optimum part to attach the camera unit 1 to for performing image pickup.

As shown in FIG. 1, the camera unit 1 has two camera parts, a front camera 2a and a rear camera 2b. Further, a front microphone 3a and a rear microphone 3b corresponding to the front and rear cameras 2a and 2b may also be provided. The front camera 2a performs image pickup to obtain an image of a scene in front of the user and the rear camera 2b performs image pickup to obtain an image of a scene in the rear of the user with regard to the arrangement shown in FIG. 2.

Figure 3:
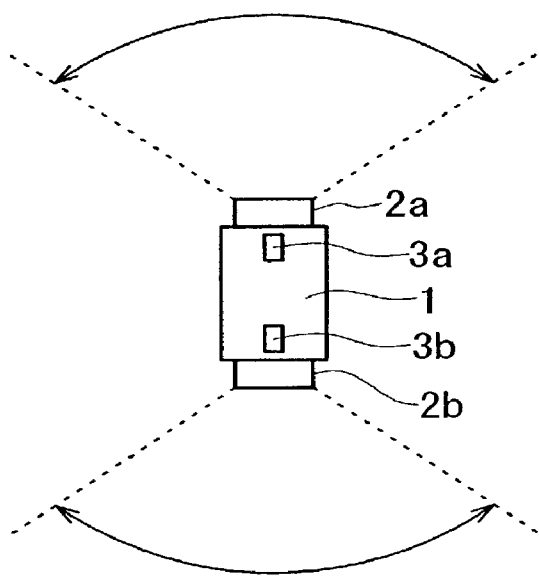
FIG. 3 is an explanatory view of a viewing angle of image pickup of the video camera of FIG. 1.

The front camera 2a and the rear camera 2b may have a wide-angle lens having a comparatively wide image-pickup viewing angle as shown in FIG. 3. By using both front camera 2a and rear camera 2b, image pickup can be performed to cover almost the entire perimeter or surroundings of the user. Although the front viewing angle and the rear viewing angle as the respective image pickup ranges of the front camera 2a and the rear camera 2b are relatively wide, they can be set to various levels in accordance with the design of the lens system to be employed or the like. The viewing angle(s) may be set in correspondence with a situation where the video camera is to be used. It may not be necessary to set the front viewing angle and the rear viewing angle to the same angle.

The front microphone 3a has a high directivity in the frontward direction from the user with regard to the arrangement shown in FIG. 2 and may pick up sound corresponding to a scene obtained by the front camera 2a. The rear microphone 3b has a high directivity in the rearward direction from the user with regard to the arrangement shown in FIG. 2 and may pick up sound corresponding to a scene obtained by the rear camera 2b. The directivities of the front microphone 3a and the rear microphone 3b may be set in a similar or different manner. As such, various designs may be utilized depending on purpose. For example, a camera unit with one non-directional microphone may be employed.

A light emission unit 4 is formed in an upper part of the camera unit 1. The light emission unit 4 emits light by a light emitting diode (LED) or the like upon image pickup by the front and rear cameras 2a and 2b. The light emitted by the light emission unit 4 may be continuous or flashing. Such light emission demonstrates image pickup operation of the video camera to people around the user. Thus, the operation of the video camera may not operated in stealth or secret operation. Further, in a case where a security guard or police officer uses the video camera, as the light emission unit 4 indicates execution of an image pickup operation, the effect of crime prevention is improved.

The control unit 10 has a recording function for recording a video signal (and/or a sound signal) obtained by image pickup by the camera unit 1 on to a memory card 30, a function for transmitting the signal from an antenna 12 to a management station to be described later, a user interface function for display and operation, and the like. For example, a display unit 11 such as a liquid crystal display (LCD) panel may be provided on a front surface of the control unit 10. The antenna 12 for communication may be formed in a desired position. A card slot 13, in which the memory card 30 may be inserted, may be formed in a desired position. Electronic data or sound may be output from a speaker 14 and/or a headphone terminal 19. Further, a cable connection terminal 15 is provided for data transmission with an information device by a predetermined transmission standard such as universal serial bus (USB) or IEEE 1394.

The user is provided with various operation elements such as a power switch 16, operation keys 18, and an emergency switch 17 to operate the image pickup apparatus. The operation keys 18 may include, but are not limited to, a cursor key, an enter key, and a cancel key. The operation keys 18 may also include keys to input commands using a cursor on the display unit 11 or specialized keys for starting image pickup, stopping image pickup, mode setting(s) and other basic operations. Further, regarding the power switch 16 and the operation keys 18, operation elements such as a jog dial, a track ball and the like may be employed which may be of a slide switch and/or push-button switch type as shown in the FIG. 1.

The emergency switch 17 is provided for an emergency. It is preferable that a large operation button is employed for infallible operation thereby reducing the amount of time needed for checking the button in a situation where time is of the essence. Further, it is preferable that either a certain level of pressing force is required to operate the switch, or, as shown in the FIG. 1, the surface of the button is set to a position which is recessed or one-step lower than the surface of the control unit 10, to avoid erroneous operation of the switch. Besides a push-button type switch, various other forms of the emergency switch 17 can be such as an arrangement wherein the user's taps on the control unit 10 are detected, or the user's voice is recognized as an indication of an emergency.

The construction of the present video camera will be described later with reference to FIG. 5. If the user wears the present video camera (which comprises the camera unit 1 and the control unit 10 as described above and as shown in FIG. 2), hands-free image pickup can be realized. Accordingly, the camera may preferably be applicable for image pickup of a work scene while a user is working, image pickup of an event or the like while the user enjoys the event, or image pickup during patrol by a security guard or police officer.

Figure 4:
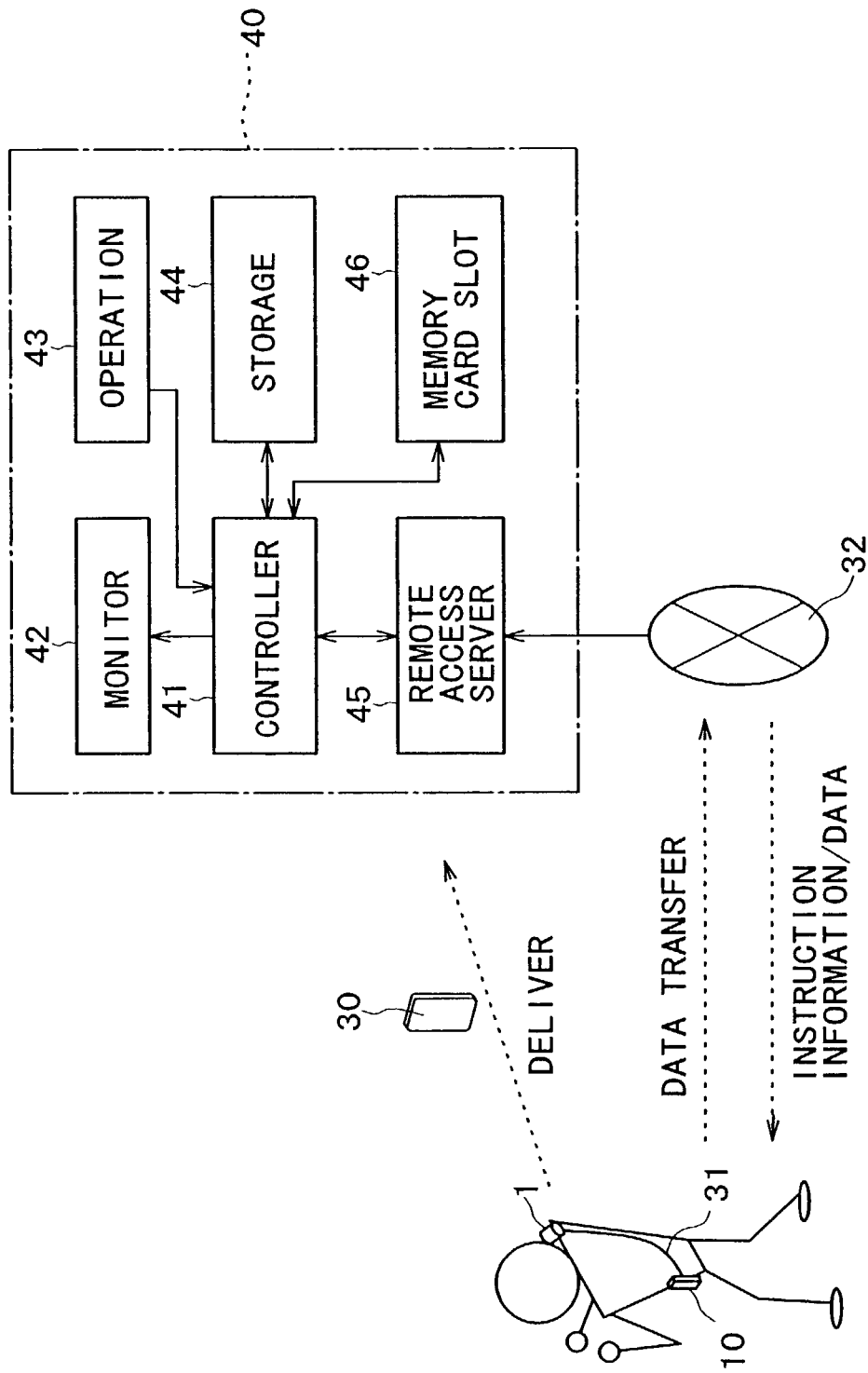
FIG. 4 is an explanatory view of a system configuration using the video camera of FIG. 1.

The present video camera may perform the function of recording video data, obtained by image pickup, on to the memory card 30 and the function of transmitting the data. FIG. 4 shows an example of a system where these functions become effective such as for security and police purposes.

The control unit 10 of the video camera is capable of data communication with a management station 40 via a transmission medium such as a public line 32 or the like. For this purpose, the control unit 10 has a communication function similar to that of a cellular phone, a personal handy phone system (PHS) or the like. Communication may also be realized by a specialized line in place of the public line 32.

The management station 40 comprises an organization or the like to supervise and manage a number of police officers or security guards on patrol while wearing the present video camera. The management station has a controller 41, a monitor 42, an operation or control unit 43, a storage unit 44, a remote access server 45, a memory card slot 46 and the like. The controller 41 controls the system in the management station 40. The monitor 42 which may comprise a display and a speaker or the like, outputs a video image and sound to an operator. The operation unit 43, which may include an operation tool such as a keyboard, a microphone, a camera and the like, allows the operator to perform various operation inputs and information input. The storage unit 44, which may include an HDD (hard disk drive), an optical disk drive, a magnetic tape drive, or the like performs recording and reproduction of information to/from a recording medium. The remote access server 45 performs a communication operation between the management station 40 and the control unit 10 of the video camera via the public line 32. The memory card slot 46, which may be similar to card slot 13 in the control unit 10 of the video camera, is adaptable to receive memory card 30 as the recording medium. The memory card 30 is made accessible by the controller 41.

The control unit 10 held by the security guard or the like transmits video data (and sound data) obtained by the camera unit 1. The data is transmitted to the management station 40 via the public line 32. The management station 40 stores the transmitted data in the storage unit 44 or outputs the data to the monitor 42, based on the control of the controller 41. That is, in the management station 40, as the security guard patrols while holding the video camera, the operator on the management station side can check the video image and sound in the area where the security guard is patrolling; and the video image and sound picked up during the patrol may be stored. As such, the stored video image and sound can be utilized in inspection and analysis and used as evidence. Further, if it is publicly known that the video image (and the sound), obtained by image pickup by the video camera used by the security guard or the like, is monitored by the management station 40, crime prevention and improvement in safety of the security guard can be increased.

The video image (and the sound) obtained by the security guard or the like with the video camera can be recorded on the memory card 30 inserted in the control unit 10. The security guard or the like can deliver the memory card 30 to the management station 40 after his/her patrol, which may be used as a patrol report. The management station 40 may put the delivered memory card 30 into the memory card slot 46, and read the video image and the sound recorded on the memory card 30 by control of the controller 41, so as to output the video image and the sound by the monitor 42 or store them in the storage unit 44.

The management station 40 can transmit various instruction information and data to the video camera (control unit 10). As described later, the station can transmit instruction information for selection of the rate for an image pickup operation to the control unit 10, based on the operator's operation by using the operation unit 43, an operation program of the controller 41 and the like. Further, the station can transmit security duty instructions as voice data, image data and/or text data, or can transmit image data and/or sound regarding a map, and/or a criminal's photograph or montage, as patrol information. Further, as described later, the station can transmit data on rate change condition such as a target sound or a target image to the control unit 10 of the video camera.

The control unit 10 of the video camera may output the operator's instruction or information as sound from the speaker 14 or the headphone terminal 19 to the user. Further, the control unit 10 may display the image data and text data transmitted as instructions or information on the display 11, thereby presenting the data to the user.

Although communication between the video camera and the management station 40 has been described herein, data communication may also be directly performed among a number of security guards or the like. For example, if the control unit 10 sends communicates in a manner similar to a cellular phone or a PHS, communication between security guards can be performed via a general public line. Alternatively, the management station 40 may function as a so-called relay station to relay messages in between security guards.

Further, the system shown in FIG. 4 has been described for security and police purposes, however, it can be applicable to other users. For example, a personal computer at a user's home may operate similar to the management station 40, such that video image and sound obtained by the video camera can be transmitted and stored in a HDD or the like of the personal computer at the user's home.

In this manner, even if the user does not have the memory card 30 upon image pickup or the capacity of the memory card is insufficient, the user can perform image pickup without knowing of such status.

2. Construction of Video Camera

Figure 5:
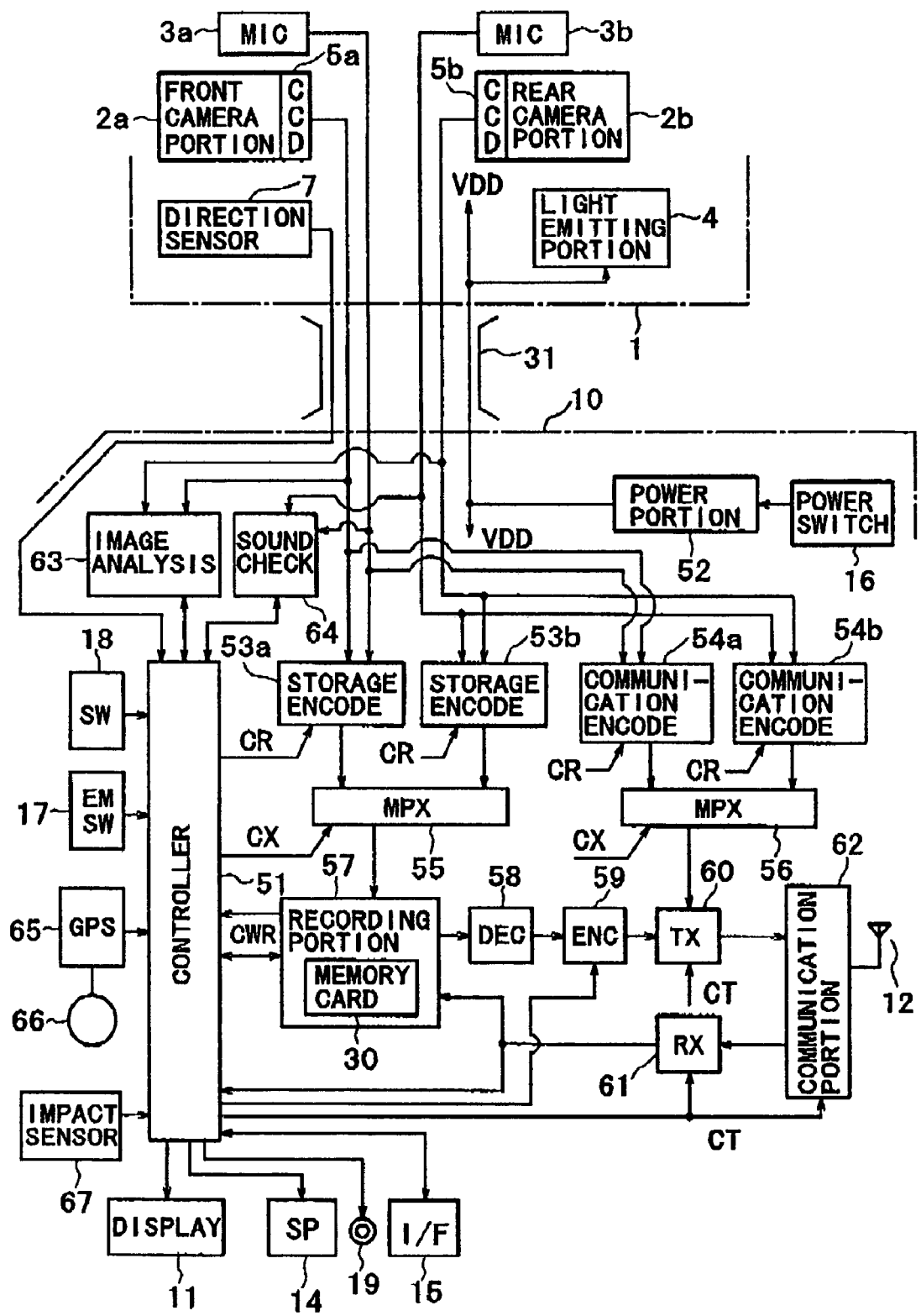
FIG. 5 is a block diagram of the video camera of FIG. 1.

FIG. 5 shows an example of the construction of the video camera. As described above, the camera unit 1 is provided with the front camera 2a and the rear camera 2b. Light obtained by image pickup by the front camera 2a is converted to a video signal by a charge-coupled device (CCD) 5a. Then, predetermined signal processing such as gain control is performed, and the signal is supplied to the control unit 10 via the cable 31. Similarly, light obtained by image pickup by the rear camera 2b is converted to a video signal by a CCD 5b. Then predetermined signal processing such as gain control is performed, and the signal is supplied to the control unit 10 via the cable 31. Sound signals obtained by the front microphone 3a and the rear microphone 3b are supplied to the control unit 10 via the cable 31.

Further, a direction sensor 7 is provided in the camera unit 1. The direction sensor 7 detects the direction of the camera unit 1. For example, the sensor detects one of east, west, south and north as a direction in which the camera unit 1 is directed, and supplies a direction detection signal to the control unit 10.

In the control unit 10, a controller 51 controls operations. The controller 51 includes a microcomputer having a CPU, a RAM, a ROM, a flash ROM and/or the like. The video signal obtained by image pickup by the front camera 2a and the sound signal obtained by the front microphone 3a transmitted from the camera unit 1 via the cable 31 are inputted into a storage encode unit 53a and a communication encode unit 54a. Further, the video signal obtained by image pickup by the rear camera 2b and the sound signal obtained by the rear microphone 3b are inputted into a storage encode unit 53b and a communication encode unit 54b. The storage encode units 53a and 53b perform, on the input video signals obtained by image pickup (and the sound signals), data compression processing based on a predetermined compression method, frame extraction processing, and encode processing for conversion to a recording format for recording on to the memory card 30. A compression rate in the data compression processing and a frame rate in the frame extraction processing are controlled by a rate control signal CR from the controller 51. The outputs from the storage encode units 53a and 53b are selected by a multiplexer 55, and supplied to a recording unit 57. The operation of the multiplexer 55 is controlled by a selection control signal CX from the controller 51.

The recording unit 57 performs recording and reproduction with respect to the memory card 30 inserted in the memory card slot 13. The access operation thereof is controlled by a read/write control signal from the controller 51. The recording unit 57 records the data, supplied via the multiplexer 55, on to the memory card 30, based on the control of the controller 51. Accordingly, the video data with a level of quality is recorded on the memory card 30. Further, the recording unit 57 reads video data (and sound data) recorded on the memory card 30 based on the control of the controller 51.

The video data and the sound data read from the memory card 30 are supplied to the controller 51, and the controller 51 supplies the video data to the display unit 11 for display-output or supplies the sound data to either speaker 14 or headphone terminal 19 for audio output. Further, it may be arranged such that the video data and the sound data, read from the memory card 30 by the recording unit 57, are subjected to decode processing by a decoder 58, then subjected to encode processing for communication by an encoder 59, and supplied to a transmission signal processor 60.

The communication encode units 54a and 54b perform, on the input video signals obtained by image pickup (and the sound signals), data compression processing based on a pre-determined compression method, frame extraction processing and encode processing for conversion to a communication format upon transmission-output. The compression rate in the data compression processing and frame rate in the frame extraction processing are controlled by a rate control signal CR from the controller 51. The outputs from the communication encode units 54a and 54b are selected by a multiplexer 56, and supplied to transmission signal processor 60. The operation of the multiplexer 56 is controlled by the selection control signal CX from the controller 51.

When the video data (and the sound data) are supplied via the multiplexer 56, the transmission signal processor 60 performs modulation processing for transmission on the data, and supplies the data to a communication unit 62. The communication unit 62 performs high-frequency modulation/amplification processing and the like, and performs data transmission from the antenna 12. The data transmission may occur at a constant rate or at variable rates. The transmitted data may be received by the management station 40.

Accordingly, the video data with a level of quality is transmitted to the management station 40. Then, in the management station 40, the scene and sound of the surroundings of the security guard or the like, and/or the voice of the security guard himself/herself can be monitored.

Further, in a case where video data and/or sound data, reproduced from the memory card 30 by the recording unit 57, as described above, is supplied to the transmission signal processor 60, the transmission signal processor 60 performs modulation processing for transmission on the video data (and the sound data). Then the communication unit 62 performs high-frequency modulation/amplification processing or the like, and data transmission is performed from the antenna 12 to the management station 40. Accordingly, the video data with a level of quality based on the compression rate and the frame rate recorded on the memory card 30, is transmitted to the management station 40.

The controller 51 can transmit notification information, other than the video and sound data obtained by image pickup or reproduction, to the management station 40. For example, when the emergency switch 17 has been operated, notification information such as one or more of notification of occurrence of emergency, current position information, ID and the like, may be supplied to the encoder 59 and processed thereat. Then, this processed notification information may be transmitted to the management station 40 by way of the transmission signal processor 60 and the communication unit 62. The current position information is position information obtained by a (GPS) antenna 66 and GPS decoder 65. Further, the ID is an ID uniquely assigned to the video camera and stored in the flash ROM of the controller 51.

The instruction information and various data, transmitted from the management station 40, may be received by the antenna 12, then subjected to high-frequency demodulation, amplification and the like by the communication unit 62, and decoded by a reception signal processor 61. Then the data is supplied to the controller 51 or the recording unit 57. The controller 51 performs a control operation or operations in correspondence with the received instruction information.

Further, in a case where image data, sound data, and/or text data and the like are transmitted from the management station 40, the received information may be provided to the user by the display unit 11 or the speaker 14, or recorded on the memory card 30 in the recording unit 57.

The operations of the transmission signal processor 60, the reception signal processor 61 and the communication unit 62 are controlled by a communication control signal CT supplied from the controller 51. The controller 51 may control call and line connection processing, data transmission/reception processing and the like to perform communication. Then regarding the transmission signal processor 60, the reception signal processor 61 and the communication unit 62, communication utilizing a public line network generally used can be performed by adopting a processing method used in a cellular phone or PHS or the like. The data transmission destination and data reception destination in the communication function may not be necessarily the management station 40. For example, communication may be performed with the control unit 10 of the video camera of another security guard or the like.

The operation keys 18 enable a number of operations to be performed and are provided on the case of the control unit 10 as previously described with reference to FIG. 1. For example, the controller 51 may display a menu of various operations on the display unit 11, and the user may perform an operation input on the menu by cursor operation or enter an operation using the operation keys 18. The controller 51 performs predetermined control corresponding to the operation supplied by the user using the operation keys 18. As such, the controller may perform various control for starting/stopping an image pickup operation, an operation mode, recording/reproduction, communication, rate control and/or the like, in correspondence with the user's operation. The operation keys 18 may not necessarily be operation elements corresponding to the operation menu on the display unit 11. Alternatively, the keys may be provided as discrete function keys such as an image-pickup start key, a stop key, a mode key and the like.

The control unit 10 may also include GPS antenna 66 and GPS decoder 65. The GPS antenna 66 receives a signal from a GPS (Global Positioning System) satellite. The GPS decoder 65 decodes the received signal, and outputs latitude and longitude as current position information. The controller 51 can grasp a current position from the latitude and longitude data from the GPS decoder, and determine whether or not the current position is within a predetermined area, or transmit the current position information.

Further, as described above, the direction sensor 7 is provided in the camera unit 1, and direction information is supplied to the controller 51. Using this information, the controller 51 can detect a current image pickup direction of the front camera 2a and of the rear camera 2b.

If the emergency switch 17 has been operated, the controller 51 performs emergency processing. In such situation, the controller may perform transmission control for emergency notification, ID notification and/or notification of the current position information obtained from the GPS decoder 65, to the management station 40 or the like.

The control unit 10 may also include a shock sensor 67. The shock sensor 67 outputs a detection signal to the controller 51 in a case where a shock applied from the outside to the user or the control unit 10 is equal to or higher than a predetermined level. It may be arranged such that, upon detection of shock, the controller 51 performs transmission control for emergency notification, ID notification and/or notification of the current position information obtained from the GPS decoder 65, to the management station 40 or the like, so as to provide an indication of an emergency.

The display unit 11 performs various display operations by control of the controller 51. That is, display of operation menu, display of operation status, display of image, text and the like received from the management station 40 or the like, display of video image reproduced from the memory card 30 by the recording unit 57, and the like may be performed. In addition to displaying video signals obtained by image pickup by the front camera 2a and the rear camera 2b, image pickup status can be performed and displayed on the display unit 11.

Various sounds may be outputted from the speaker 14 (and the headphone terminal 19) by the control of the controller 51. Such sounds may include sound output based on sound data received from the management station 40 or the like, alarm output, output of incoming-tone notifying the user of data reception, and the like. Further, sound monitoring output upon image pickup can be performed.

In the cable connection terminal 15, data transmission based on a predetermined interface standard is possible by cable connection with an external information device. For example, uploading for a version upgrade of an operation program of the controller 51, transmission of data reproduced from the memory card 30 to an external device, and/or data loading of data as a target sound or target image to be described later, are possible.

The control unit 10 may also include an image analysis unit 63. Video signals, obtained by image pickup by the front camera 2a and the rear camera 2b, are supplied to the image analysis unit 63, and the unit performs various analysis processing on the supplied respective video signals obtained by image pickup. Examples of such processing may include detecting the motion of a subject by comparing processing between frames of the video signal, and when a particular image such as a particular color, building, scene or person is set by the controller 51 as a target image, detecting whether or not an obtained image corresponds to the target image. Detection information from the image analysis unit 63 is outputted to the controller 51, and the controller 51 performs predetermined control such as rate control in correspondence with the detection information.

Further, the control unit 10 may also include a sound check unit 64. Sound signals, picked up by the front microphone 3a and the rear microphone 3b, are supplied to the sound check unit 64 which performs check processing thereon. Such check processing may be performed on the respective sound signals from the front microphone 3a and the rear microphone 3b to determine whether or not a sound volume level is equal to or greater than a predetermined value. In this case, detection as to whether a large sound volume has occurred in the front direction or rear direction, is performed from the difference between front/rear sound volumes, delay status and the like. Further, a particular sound, for example, an alarm sound such as emergency bell, an explosion, an accident, a sound of a vehicle, or a particular person's voice print may be set as a target sound by the controller 51, and processing to detect whether or not an inputted sound (which corresponds to or which is similar to the target sound) may be performed. In this case, a determination may be performed as to whether a target sound has occurred in the front direction or rear direction, which may involve the sound signals from the front microphone 3a and the rear microphone 3b, is performed from the difference between front/rear sound volumes, delay status and the like. Information from the check processing may be supplied to the controller 51, and the controller 51 performs predetermined control such as rate control, in correspondence with such information.

When the power switch 16 is placed in the on-state, a power source 52 starts an operation to supply an operation power-supply voltage VDD to the respective units, and turns the video camera into a power-on status. The power source 52 includes a battery such as a dry cell or a charging battery, and supplies power to the respective units. When the camera goes into the power-on status and the power-supply voltage VDD is supplied, the light emission unit 4 in the camera unit 1 starts emitting light in a manner as previously described.

On the camera unit 1 side, the image pickup and sound pickup operations may be performed when the camera goes into the power-on status and the power-supply voltage VDD is supplied. That is, in such situation, the camera may go into a mode where video signals and sound signals obtained by image pickup are outputted to the control unit 10. In this case, recording/transmission on/to the memory card 30 may not be performed. Instead, a monitor video image may be outputted to the display unit 11. Further, recording and transmission may not actually be performed until the user has performed an image-pickup start operation by using the operation keys 18.

Additionally recording and transmission of video signals obtained by image pickup and sound signals may be performed when the camera goes into power-on status or mode. That is, the operation can be simplified such that the image pickup operation including recording and transmission is started by the user turning the power on with the power switch 16. Further, the light emission by the light emission unit 4 may be controlled by the controller 51 such that light emission occurs during a period in which the camera is in the power-on mode and recording or transmission is performed. The controller 51 may also detect the operation of the power switch 16 and cause the power source 52 to start the power supply in correspondence with the detection.

Although the present video camera has been described with the above construction, various modifications such as those described below can be made thereto.

The outer appearance of the camera unit 1 and the control unit 10 and the arrangement and the shape of the operation elements for user interface and display are not limited to that previously described. Alternatively, various other shapes and/or arrangements may be utilized.

Instead of the camera unit 1 and the control unit 10 being interconnected via the cable 31, radio transmission of video signals obtained by image pickup and sound signals may be performed by a transmitter utilizing a radio wave, infrared radiation or the like.

Additionally, the camera unit 1 and the control unit 10 may not be separate units, but may be integrally formed.

The present video camera has the front camera 2a and the rear camera 2b. However, the camera may have three or more cameras and the respective cameras may perform image pickup in different directions.

Respective microphones may be provided corresponding to the two or more cameras. Further, a microphone shared by all or a part of the respective cameras may be provided. As long as at least one microphone is provided, the video camera may pickup sound.

Further, a pan/tilt mechanism may be provided for one or more of the cameras such that the image pickup direction may be changed in an upward/downward/leftward/rightward direction.

Image pickup may be performed in more than the two directions previously described. For example, image pickup may be performed in various directions such as frontward, rearward, leftward, rightward, upward, downward and/or the like. The multiple cameras can also be arranged such that one or more of the cameras may be panned/tilted, and the user can set the image pickup directions of the respective cameras.

Further, it is conceivable that image pickup may almost be performed simultaneously in plural directions by providing one camera with a mechanism for changing an image pickup direction at high-speed.

The camera unit 1 may also include multiple light emission units.

Although the present video camera may use the memory card 30, a disk drive device, for example, an optical disk or a magneto-optical disk, may be provided in the control unit 10, and a video image obtained by image pickup may be recorded on a disk recording medium. Alternatively, a magnetic tape medium may also be used as the recording medium.

Not all the elements shown in FIG. 5 may be used in the present video camera, and other elements than those may be added. Additionally, the storage encode units and the communication encode units may be formed as one circuit unit.

Further, the data obtained by the video camera may be only transmitted and not recorded. Alternatively, the obtained data may only be recorded and not transmitted.

The image analysis unit 63, the sound check unit 64, the emergency switch 17, the GPS antenna 66 and the GPS decoder 65, and the shock sensor 67 may detect a rate change condition used for rate control (which will be described later), however, not all the units may detect the rate change condition. Further, the rate change condition may also be detected by a temperature sensor, an acceleration sensor and/or the like.

When the camera is used for purposes other than security purposes, the emergency switch 17 may be omitted.

Further, a short-distance radio communication function such as Bluetooth™, other device interface functions and user interface functions and the like, may be provided.

3. Image Pickup Operation Mode

As shown in FIG. 6, an image pickup operation of the present video camera may be performed in one of a storage mode, a transmission mode, and a multi mode. The storage mode may record data obtained by the video camera on the memory card 30 but may not transmit the data to the management station 40. The transmission mode may transmit the data obtained by the video camera to the management station 40 but may not record the data on to the memory card 30. The multi mode may record the obtained data on the memory card 30 and/or transmit the data to the management station 40.

The mode may be changed, for example, by mode-control instruction information transmitted by the management station 40 or by using the operation keys 18. If a different mode is desired, the controller 51 may perform the mode change.

However, the present video camera may be constructed such that only one of the previously described modes may be used for image pickup. On the other hand, the camera may also be constructed such that one of two possible modes (i.e., the multi mode and the transmission mode, the multi mode and the storage mode, or the storage mode and the transmission mode) may be selected to perform the image pickup operation. In any one of the modes, the controller 51 may perform rate control on the storage encode units 53a and 53b or the communication encode units 54a and 54b. The rate may be changed to one of a normal rate, a front priority rate and a rear priority rate.

In the normal rate, video data obtained by the front camera 2a and the rear camera 2b have the same quality. That is, in the normal rate, the frame rate used in the frame extraction processing by the storage encode unit 53a and the communication encode unit 54a on a video signal obtained from the front camera 2a may be controlled such that the same frame rate may be used in the frame extraction processing by the storage encode unit 53b and the communication encode unit 54b on a video signal obtained from the rear camera 2b. Further, in the normal rate, the compression rate used in the data compression processing by the storage encode unit 53a and the communication encode unit 54a on a video signal obtained from the front camera 2a may be controlled such that the same compression rate may be used in the data compression processing by the storage encode unit 53b and the communication encode unit 54b on a video signal obtained from the rear camera 2b.

Accordingly, in the multi mode and the storage mode, if the normal rate is set, the video data obtained by the front camera 2a and the rear camera 2b and recorded on the memory card 30 have the same quality. Further, in the multi mode and the transmission mode, if the normal rate is set, the video data obtained by the front camera 2a and the rear camera 2b and transmitted to the management station 40 or the like have the same quality.

In the front priority rate, video data obtained by the front camera 2a has a higher quality than video data obtained by the rear camera 2b. That is, in the front priority rate, the frame rate used in the frame extraction processing by the storage encode unit 53a and the communication encode unit 54a on a video signal obtained from the front camera 2a may be higher than the frame rate used in the frame extraction processing by the storage encode unit 53b and the communication encode unit 54b on a video signal obtained from the rear camera 2b. Further, the compression rate used in the data compression processing by the storage encode unit 53a and the communication encode unit 54a on a video signal obtained from the front camera 2a may be lower than the compression rate used in the data compression processing by the storage encode unit 53b and the communication encode unit 54b on a video signal obtained from the rear camera 2b.

Accordingly, in the multi mode and the storage mode, if the front priority rate is set, video data obtained by the front camera 2a may have a higher quality than video data obtained by the rear camera 2b which may be recorded on the memory card 30. Further, in the multi mode and the transmission mode, if the front priority rate is set, video data obtained by the front camera 2a may have a higher quality than video data obtained by the rear camera 2b which may be transmitted to the management station 40 or the like.

In the rear priority rate, video data obtained by the rear camera 2b has a higher quality than video data obtained by the front camera 2a. That is, in the rear priority rate, the frame rate used in the frame extraction processing by the storage encode unit 53b and the communication encode unit 54b on a video signal obtained from the rear camera 2b may be higher than the frame rate used in the frame extraction processing by the storage encode unit 53a and the communication encode unit 54a on a video signal obtained from the front camera 2a. Further, the compression rate used in the data compression processing by the storage encode unit 53b and the communication encode unit 54b on a video signal obtained from the rear camera 2b may be lower than the compression rate used in the data compression processing by the storage encode unit 53a and the communication encode unit 54a on a video signal obtained from the front camera 2a.

Accordingly, in the multi mode and the storage mode, if the rear priority rate is set, video data obtained by the rear camera 2b may have a higher quality than video data obtained by the front camera 2a which may be recorded on the memory card 30. Further, in the multi mode and the transmission mode, if the rear priority rate is set, video data obtained by the rear camera 2b may have a higher quality than video data obtained by the front camera 2a which may be transmitted to the management station 40 or the like.

FIGS. 7(a)-7(c) schematically shows a frame rate change. For example, FIG. 7(a) shows frame extraction timing on a video signal obtained by the front camera 2a and frame extraction timing on a video signal obtained by the rear camera 2b for the normal rate. In this case, regarding both front video image and rear video image, video data can be obtained at an equal frame rate, such as x frames, within a unit period such as one second.

FIG. 7(b) shows a case of the front priority rate. Within the unit period, such as one second, the number of frames extracted from the video signal obtained by the front camera 2a may be larger than the number of frames extracted from the video signal obtained by the rear camera 2b. That is, the resolution of the front video image may be increased in a time-sequential direction, thereby improving the quality of the front video image.

Further, FIG. 7(c) shows a case of the rear priority rate. Within the unit period, such as one second, the number of frames extracted from the video signal obtained by the rear camera 2b may be larger than the number of frames extracted from the video signal obtained by the front camera 2a. That is, the resolution of the rear video image may be increased in a time-sequential direction, thereby improving the quality of the rear video image.

The actual number of frames extracted in the unit period in the respective front priority rate and the rear priority rate can be set to various values as a matter of design. The design may be made in correspondence with, among other things, a transfer-clock frequency in the CCD units 5a and 5b, desired image quality, and the like.

As described above, increasing the frame rate improved the video quality. Alternatively, video data at a lower compression rate has higher video quality.

In the examples of FIGS. 7(a)-7(c), as a whole, the same rate may be set. That is, the total number of frames extracted within the unit period may be the same in the normal rate, the front priority rate, and/or the rear priority rate. For example, in FIG. 7(a) where x frames are extracted from front and rear video images within the unit period, the total number of frames extracted may be 2x. Further, the total number of frames extracted may also be 2x as shown in FIGS. 7(b) and 7(c). Alternatively, in the front priority rate and the rear priority rate, the entire frame rate may be higher than the normal rate, as shown in FIGS. 8(a)-8(c).

As shown in FIG. 8(a), where frame extraction timing from the front and rear video images may be at the normal rate, y frames are extracted from the front and rear video images within the unit period and the total number of frames may be 2y. In the case of the front priority rate as shown in FIG. 8(b) and in the case of the rear priority rate as shown in FIG. 8(c), the number of total frames at the front and rear rates is larger than 2y. Further, even at the front priority rate, the frame rate for the rear camera 2b may be higher than the frame rate for the rear camera 2b at the normal rate. Also, even at the rear priority rate, the frame rate for the front camera 2a may be higher than the frame rate for the front camera 2a at the normal rate. That is, at either the front priority rate or the rear priority rate, the image quality of both front and rear video images may be higher than the image quality of both front and rear video images at the normal rate. Further, the image quality of one of the front video image and the rear video image may be higher than the other video image.

Also, as shown in FIGS. 9(a)-9(c), at the front and rear priority rates, the entire frame rate may be higher than the normal rate. As shown in FIG. 9(a), where frame extraction timing from the front and rear video images may be at the normal rate, y frames are extracted from the front and rear video images within the unit period and the total number of frames may be 2y. In the front priority rate, as shown in FIG. 9(b), and in the rear priority rate, as shown in FIG. 9(c), the number of total frames at the front and rear rates may be larger than 2y.

However, at the front priority rate, the frame rate for the rear camera 2b may be lower than the normal rate. Additionally, at the rear priority rate, the frame rate for the front camera 2a may be lower than the normal rate. As a result, in the front priority rate and the rear priority rate, the image quality may be improved for the video image with priority.

It may be arranged such that at the front priority rate, the number of frames in the unit period may be zero in the communication encode unit 54b and the storage encode unit 53b for a rear video image. Similarly, at the rear priority rate, the number of frames in the unit period may be zero in the communication encode unit 54a and the storage encode unit 53a for a front video image.

In this manner, various methods can be used for frame rate control at the normal rate, the front priority rate and the rear priority rate and similarly, various methods can be used for compression rate change. Accordingly, FIG. 10 shows various aspects of a rate control method. As can be seen in FIG. 10, "f1" to "f7" are examples of aspects of frame rate control at the front priority rate and the rear priority rate. Further, "m1" to "m5" in FIG. 10 are examples of aspects of compression rate control at the front priority rate and the rear priority rate. The terms "increased", "reduced" and "not changed" mean that "the rate is increased", "the rate is decreased" and "the rate is not changed" respectively, with the normal rate as a reference rate. Further, "front frame rate" and "front compression rate" indicate that rate control may be performed on the storage encode unit 53a and the communication encode unit 54a, and "rear frame rate" and "rear compression rate" indicate that rate control may be performed on the storage encode unit 53b and the communication encode unit 54b.

An example of the contents of "f1" to "f7" are as follows:

<f1>—The total rate may be constant at the normal rate, the front priority rate and the rear priority rate. At the front priority rate, the front frame rate may be increased, and the rear frame rate may be reduced. At the rear priority rate, the front frame rate may be reduced, and the rear frame rate may be increased.

<f2>—The total rate may be higher than the normal rate at the front priority rate and the rear priority rate. At the front priority rate, the front frame rate may be increased, and the rear frame rate may not be changed. At the rear priority rate, the front frame rate may not be changed, and the rear frame rate may be increased. That is, this control corresponds to the example where one of the rates may be increased, to improve quality.

<f3>—The total rate of the front priority rate and the rear priority rate may be higher than the normal rate. At the front priority rate, the front and rear frame rate may be increased and the front frame rate may be higher than the rear frame rate. At the rear priority rate, the front and rear frame rate may be increased and the rear front frame rate may be higher than the front frame rate. That is, one of the rates may be increased more than the other rate to improve quality.

<f4>—The total rate may be higher than the normal rate at the front priority rate and the rear priority rate. At the front priority rate, the front frame rate may be greatly increased, and the rear frame rate may be reduced. At the rear priority rate, the front frame rate may be reduced, and the rear frame rate may be greatly increased. That is, this control corresponds to the example where the quality at the one of the rates with higher priority may be greatly improved, as shown in FIG. 9.

<f5>—The total rate may be lower than the normal rate at the front priority rate and the rear priority rate. At the front priority rate, the front frame rate may not be changed, and the rear frame rate may be reduced. At the rear priority rate, the front frame rate may be reduced, and the rear frame rate may not be changed. That is, the quality of the video image may be higher at the rate with a higher priority by lowering the quality at the other rate with a lower priority.

<f6>—The total rate may be lower than the normal rate at the front priority rate and the rear priority rate. At the front priority rate, the front frame rate and the rear frame rate may be reduced and the front frame rate may be higher than the rear frame rate. At the rear priority rate, the front frame rate and the rear frame rate may be reduced and the rear frame rate may be higher than the front frame rate. That is, to improve quality, the rate of reduction may be lowered.

<f7>—The total rate may be lower than the normal rate at the front priority rate and the rear priority rate. At the front priority rate, the front frame rate may be reduced, and the rear frame rate may be greatly reduced. At the rear priority rate, the front frame rate may be greatly reduced, and the rear frame rate may be reduced. That is, the quality at the rate with a higher priority may be relatively improved by greatly reducing the other rate with a lower priority.

An example of the contents of "m1" to "m5" are as follows:

<m1>—At the front priority rate, the front compression rate may be reduced and the rear compression rate may be increased. At the rear priority rate, the front compression rate may be increased and the rear compression rate may be reduced. That is, to improve quality for a rate with a higher priority, the higher priority rate may be reduced (lower compression rate improves quality) and the other rate may be increased.

<m2>—At the front priority rate, the front compression rate may be reduced and the rear compression rate may not be changed. At the rear priority rate, the front compression rate may not be changed and the rear compression rate may be reduced. That is, to improve quality, one of the rates may be reduced.

<m3>—At the front priority rate, the front compression rate may not be changed and the rear compression rate may be increased. At the rear priority rate, the front compression rate may be increased and the rear compression rate may not be changed. That is, the quality of one of the rates with a higher priority may be improved by lowering the quality of the other rate.

<m4>—At the front priority rate, the front compression rate and the rear compression rate are reduced. The front compression rate may be lower than the rear compression rate. At the rear priority rate, the front compression rate and the rear compression rate are reduced. In this case, the rear compression rate may be lower than the front compression rate. That is, the reduction rate for one of the rates is greater than the reduction rate for the other rate thereby improving the quality of the rate with a higher priority.

<m5>—At the front priority rate, the front compression rate and the rear compression rate are increased. The front compression rate may be lower than the rear compression rate. At the rear priority rate, the front compression rate and the rear compression rate are increased. In this case, the rear compression rate may be lower than the front compression rate. That is, the reduction rate of one of the rates may be lower than the reduction rate of the other rate.

In this manner, regarding the frame rate, the control aspects of f1 to f7 may be employed, and regarding the compression rate, the control aspects of m1 to m5 may be employed. Any one of f1 to f7 and m1 to m5 can be considered as a rate control method when the rate is changed to the front priority rate or the rear priority rate.

For example, where only the frame rate change may be performed (the compression rate may be fixed), any one of the rate control methods f1 to f7 may be employed. Further, in a case where only compression rate change may be performed (the frame rate may be fixed), any one of the rate control methods m1 to m5 may be employed. Further, in a case where both the frame rate and the compression rate may be changed, a combination of one of the control methods f1 to f7 and one of the control methods m1 to m5 may be employed as the rate control method.

In any of the above rate control methods, control may be performed such that the compression rate with higher priority may be lower than the other compression rate. Alternatively, control may be performed such that the frame rate in the frame extraction processing with a higher priority may be higher than the other frame rate in the frame extraction processing.

4. Rate Change by Operation or Instruction

As described above, the controller 51 may control the rate to change the frame rate and/or the compression rate on the storage encode units 53a and 53b and the communication encode units 54a and 54b. For this purpose, the controller 51 detects various rate change conditions and may control the rate change corresponding to the detected rate change condition.

Hereinbelow, respective examples of processing regarding the rate change control by the controller 51 will be described.

First, processing performed by the controller 51 to control the rate change in accordance with the user's operation or an instruction from the management station 40 will be described with reference to FIG. 11. The processing in FIG. 11 (as well as FIGS. 12, 13 and 14 to be described later) is an example of rate change control performed by the controller 51 upon execution of the image pickup operation which may occur in an operation mode where data may be recorded on the memory card 30 and/or transmitted.

Figure 11:
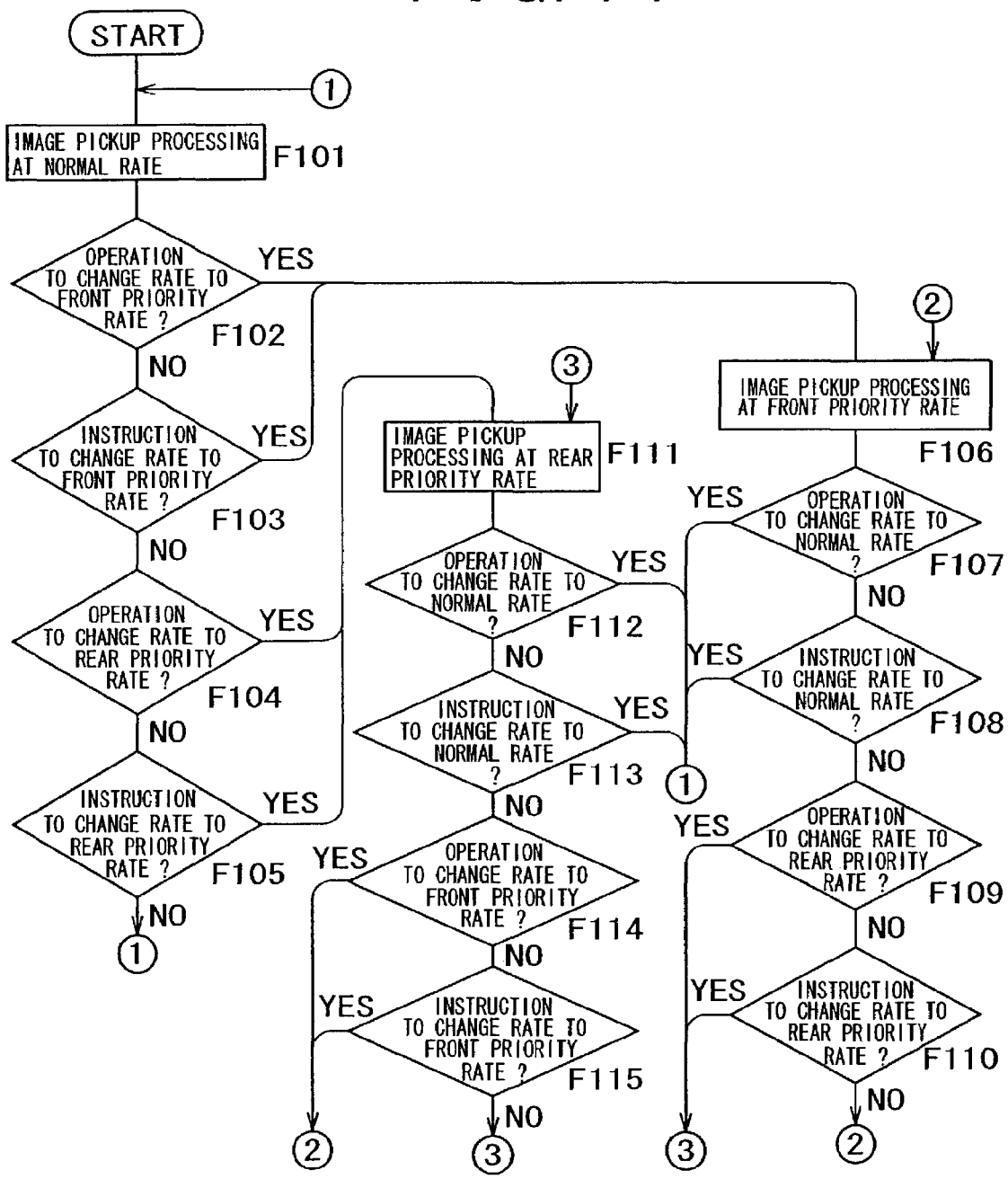
FIG. 11 is a flowchart of rate change processing that may be preformed by the video camera of FIG. 1.

In FIG. 11, at the start of the image pickup operation (recording/transmission) the controller 51 instructs the respective encode units 53a, 53b, 54a and 54b to set the normal rate, as shown in step F101. That is, the controller 51 may set the frame rate and the compression rate for thee storage encode unit 53a and the communication encode units 54a and the frame rate and the compression rate for the storage encode unit 53b and the communication encode unit

54b at the same rate. In this case, the controller 51 may detect rate change conditions at steps F102 to F105.

At step F102, the controller 51 may monitor whether or not the user has performed a change operation to change the rate to the front priority rate. At step F103, it monitors whether or not the rate change instruction to change the rate to the front priority rate has been received from the management station 40. Further, at step F104, the controller 51 may monitor whether or not the user has performed a change operation to change the rate to the rear priority rate. At step F105, it monitors whether or not a rate change instruction to change the rate to the rear priority rate has been received from the management station 40. If these rate change conditions are not detected, the controller returns to step F101 where it continues the image pickup operation at the normal rate.

If an operation or instruction to change the rate to the front priority rate has been detected at step F102 or F103, the controller 51 proceeds to step F106, where image pickup (recording/transmission) may be performed at the front priority rate. That is, the frame rate and/or the compression rate for the storage encode unit 53a and the communication encode unit 54a may be higher than the frame rate and/or lower than the compression rate for the storage encode unit 53b and the communication encode unit 54b. This may set a status where video data obtained by the front camera 2a, has a higher quality than video data obtained by the rear camera 2b.

During a period where image pickup may be performed at the front priority rate, the controller 51 may detect the rate change condition at steps F107 to F110. At step F107, the controller monitors whether or not the user has performed the change operation to change the rate to the normal rate. At step F108, it monitors whether or not the rate change instruction to change the rate to the normal rate has been received from the management station 40. Further, at step F109, the controller 51 may monitor whether or not the user has performed the change operation to change the rate to the rear priority rate. At step F110, it monitors whether or not the rate change instruction to change the rate to the rear priority rate has been received from the management station 40. If these rate change conditions are not detected, the controller returns to step F106 where it continues the image pickup operation at the front priority rate.

If an operation or instruction to change the rate to the rear priority rate has been detected at above step F104 or F105, the controller 51 proceeds to step F111 where the image pickup (recording/transmission) may be performed at the rear priority rate. That is, the frame rate and/or the compression rate for the storage encode unit 53b and the communication encode unit 54b may be higher than the frame rate and/or lower than the compression rate for the storage encode unit 53a and the communication encode unit 54a. As such, video data obtained by the rear camera 2b, has a higher quality than video data obtained by the front camera 2a.

During a period where image pickup may be performed at the rear priority rate, the controller 51 may detect the rate change condition at steps F112 to F115. At step F112, the controller 51 may monitor whether or not the user has performed the change operation to change the rate to the normal rate. At step F113, it monitors whether or not the rate change instruction to change the rate to the normal rate has been received from the management station 40. Further, at step F114, the controller 51 may monitor whether or not the user has performed the change operation to change the rate to the front priority rate. At step F115, it monitors whether or not the rate change instruction to change the rate to the front priority rate has been received from the management station 40. If these rate change conditions are not detected, the controller returns to step F111 where it continues the image pickup operation at the rear priority rate.

If the change operation or the change instruction from the management station 40 to change the rate to the normal rate has been detected at any of steps F107, F108, F112 and F113, the controller proceeds to step F101, at which the controller 51 performs control to change the rate to the normal rate. That is, the controller controls the frame rate and the compression rate for the storage encode unit 53a and the communication encode unit 54a, and the frame rate and the compression rate for the storage encode unit 53b and the communication encode unit 54b so as to be equal. At step F109 or F110, if the change operation or the change instruction to change the rate to the rear priority rate has been detected, the controller proceeds to step F111 where the controller 51 may change the rate to the rear priority rate. At step F114 or F115, if the change operation or the change instruction to change the rate to the front priority rate has been detected, the controller proceeds to step F106 where the controller 51 may change the rate to the front priority rate.

As described above, the controller 51 may control the compression rate in the data compression processing and the frame rate in the frame extraction processing in the respective encode units 53a, 53b, 54a and 54b to change the rate to the normal rate, the rear priority rate or the front priority rate. Accordingly, if the user wants to record/transmit high-quality video data for a front scene, the user may perform the change operation to change the rate to the front priority rate by using the operation keys 18. If the user wants to record/transmit high-quality video data for a rear scene, the user may perform the change operation to change the rate to the rear priority rate by using the operation keys 18.

Further, an operator at the management station 40 monitoring data transmitted from the video camera, can change the rate to the front priority rate or the rear priority rate at a desired point. As an example, when the operator wants to carefully check either the front or rear of the video image or when the operator's attention is attracted by something that was ignored by the user, the operator can instruct the video camera to change the rate to the front priority rate or the rear priority rate. As such, more detailed video information can be obtained by the management station 40, thereby improving security.

Further, the present video camera may be provided with the emergency switch 17 as described above. For example, upon occurrence of an incident, accident, and/or criminal pursuit, the user may depresses the emergency switch 17. As described above, the emergency switch 17 may be a large switch which the user can easily operate. When the emergency switch 17 has been operated, the controller 51 supplies data notifying the occurrence of an emergency, the video camera ID, and the current position information detected by the GPS decoder 65 to the encoder 59. The data is processed by the transmission signal processor 60 and the communication unit 62 and transmitted to the management station 40 by way of antenna 12. Transmitting the data indicative of an emergency, informs the operator of an emergency so that the operator may pay attention to the video image being transmitted from the video camera.

In the above case, it may be very difficult if not impossible for the user to pay attention to the image pickup direction of the video camera. However, since the operator may be aware of the emergency, the operator can instruct the video camera to change the rate to the front priority rate or the rear priority rate so that a high quality image can be obtained in a desired direction.

Further, when multiple users are patrolling, upon operation of the emergency switch 17 by one user, the management station 40 may notify the other users. In particular, the management station 40 can specify the emergency, the user who encountered the emergency (video camera ID), and the location of the emergency. In correspondence with the specified information, the management station 40 may transmit an emergency instruction to the video cameras of all the users near the location of the emergency or users patrolling with the specified user. As such, the users may be able to handle the emergency and since the video image may be transmitted from the user who activated the emergency switch to the other respective users they may have more detailed information about the emergency.

Further, since the management station 40 can instruct all the video cameras to change the rate, high quality video images in peripheral respective areas may be obtained.

When the emergency instruction has been received from another user or the management station 40, the controller 51 may output an emergency incoming-tone or a voice instruction from the speaker 14. Further, the location of the emergency may be transmitted as GPS current-position information from the management station 40. Additionally, a map or the like may be displayed on the display unit 11 such that the respective users can accurately grasp the location of the incident.

At the time of the user's operation of the emergency switch 17, the video camera may be operating in the storage mode and the obtained video data may not be transmitted to the management station 40. In such a case, the management station 40 (or other users) may not be notified of the emergency. Accordingly, the controller 51 may automatically change the mode to the transmission mode or the multi mode upon activation of the emergency switch to transmit the video data to the management station 40.

Further, the present video camera may include shock sensor 67. The shock sensor 67 may detect a shock applied to the video camera. The shock may occur when the user is attacked by a thug or the user himself/herself encounters an accident. As such, the user may not be able to depress the emergency switch 17. Accordingly, the controller 51 may transmit the notification of the emergency upon detection of the shock, in a manner similar to the operation of the emergency switch 17.

5. Rate Change by Sound Check

Next, rate control by the controller 51 which can be performed by discriminating the rate change condition from processing of the sound check unit 64 and changing a rate status will be described with reference to FIG. 12.

In this case, the sound check unit 61 may compare sound signals supplied from the front microphone 3a and the rear microphone 3b with a threshold value as a predetermined sound volume level. If the volumes of the sound signals inputted from microphones 3a and 3b exceed the threshold value, the sound check unit 61 outputs a detection signal to the controller 51. At that time, the sound check unit 61 may discriminate whether the large sound volume has occurred in the front or rear direction. The direction may be discriminated by taking the difference between the sound volumes and delay statuses of the respective sound signals inputted from the microphones 3a and 3b. Once the direction is discriminated, the sound check unit 61 may output the direction information to controller 51.

Figure 12:
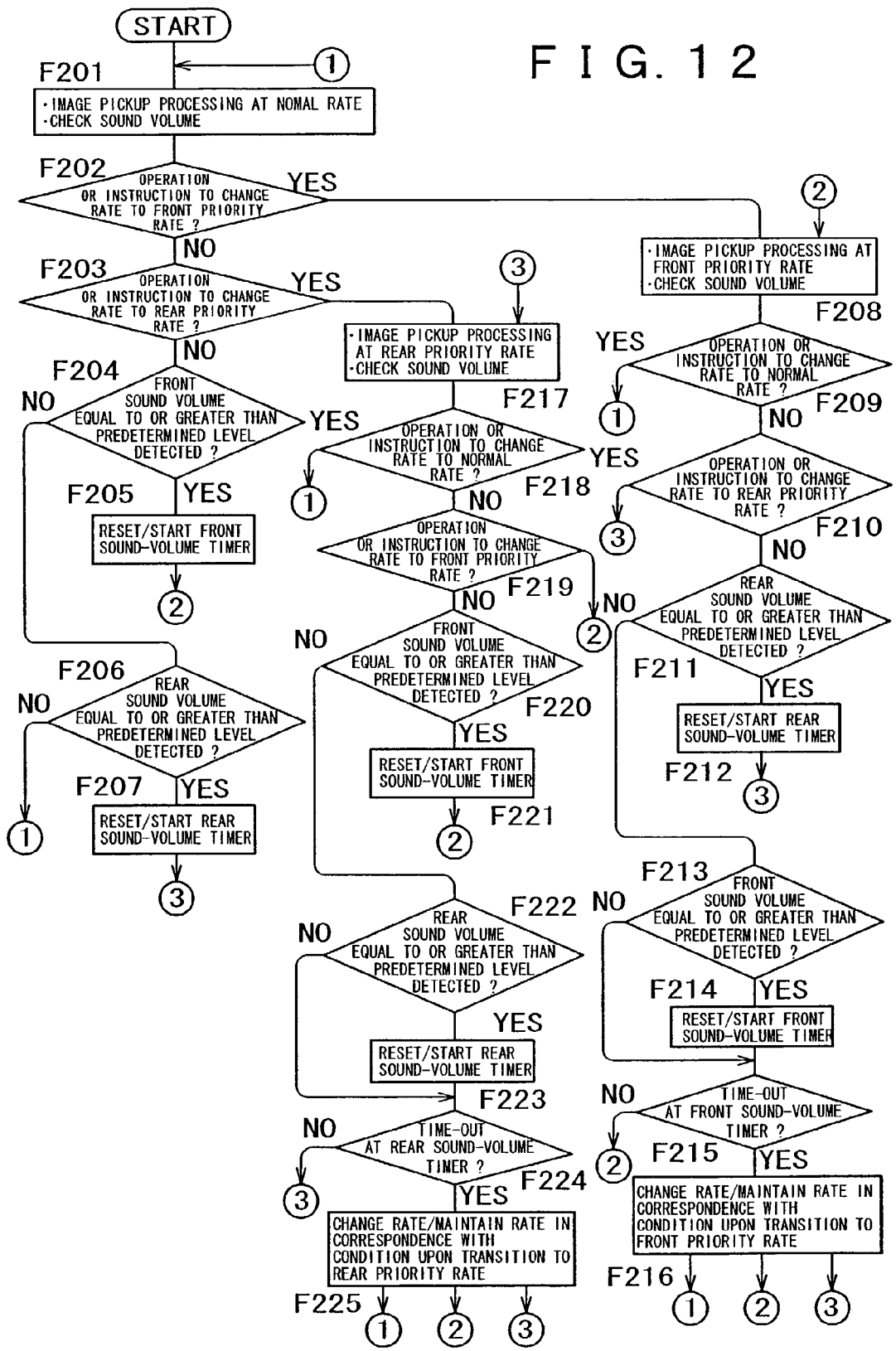
FIG. 12 is a flowchart of rate change processing based on a sound check that may be preformed by the video camera of FIG. 1.

In FIG. 12, upon start of image pickup (recording/transmission), the controller 51 instructs the respective encode units 53a, 53b, 54a and 54b to set the normal rate at step F201. That is, the controller 51 may set the frame rate and the compression rate for the storage encode unit 53a and the communication encode unit 54a equal to the frame rate and the compression rate for the storage encode unit 53b and the communication encode unit 54b. Further, the controller 51 monitors the detection signal from the sound check unit 64.

In this case, the controller 51 may detect the rate change conditions at steps F202, F203, F204, and F206. At step F202, the controller may monitor whether or not the user has performed the operation to change the rate to the front priority rate or the rate change instruction to change the rate to the front priority rate has been received from the management station 40. At step F203, the controller may monitor whether or not the user has performed the change operation to change the rate to the rear priority rate or the rate change instruction to change the rate to the rear priority rate has been received from the management station 40. At step F204, the controller may discriminate whether or not the detection signal for a large sound volume in the front direction has been outputted from the sound check unit 64. At step F206, the controller may discriminate whether or not a large sound volume in the rear direction has been outputted from the sound check unit 64. If these rate change conditions are not detected, the controller returns to step F201 where it may continue the image pickup operation at the normal rate.

At step F202, if the change operation is performed by the user or an operation or instruction from the management station 40 to change the rate to the front priority rate has been detected, the controller 51 proceeds to step F208 where image pickup (recording/transmission) may be performed at the front priority rate. That is, the controller may control the frame rate and/or the compression rate for the storage encode unit 53a and the communication encode unit 54a to be higher than the frame rate and/or lower than the compression rate for the storage encode unit 53b and the communication encode unit 54b. As such, video data obtained by the front camera 2a may have a higher quality than video data obtained by the rear camera 2b. Further, the controller 51 continues monitoring of the detection signal from the sound check unit 64.

During a period where image pickup may be performed at the front priority rate, the controller 51 may detect the rate change condition at steps F209, F210, F211, F213 and F215. At step F209, the controller may monitor whether or not the user has performed the change operation to change the rate to the normal rate or the rate change instruction to change the rate to the normal rate has been received from the management station 40. At step F210, the controller may monitor whether or not the user has performed the change operation to change the rate to the rear priority rate or the rate change instruction to change the rate to the rear priority rate has been received from the management station 40. At step F211, the controller may discriminate whether or not the detection signal of a large sound volume in the rear direction has been outputted from the sound check unit 64. At step F213, the controller may discriminate whether or not the detection signal of a large sound volume in the front direction has been outputted from the sound check unit 64. If the detection signal has been outputted, the controller proceeds to step F214 where it may reset and restart a front sound-volume timer. The front sound-volume timer may count a duration or a period when the large sound volume in the front direction is not detected using an internal timer of the controller 51. At step F215, the controller may discriminate whether or not the duration where the large sound volume in the front direction is not detected is equivalent to a predetermined period. That is, whether the front sound-volume timer has timed out. During a period in which this detection may not be made, the controller returns to step F208 where it continues the image pickup at the front priority rate.

At step F203 in the normal rate status, or at step F210 in the front priority rate, if the user's change operation or an operation or instruction from the management station 40 for transition to the rear priority rate has been detected, the controller 51 proceeds to step F217 where it may control the image pickup (recording/transmission) to perform at the rear priority rate. That is, the controller 51 may control the frame rate and/or the compression rate for the storage encode unit 53b and the communication encode unit 54b to be higher than the frame rate and/or lower than the compression rate for the storage encode unit 53a and the communication encode unit 54a. As such, video data obtained by the rear camera 2b may have a higher quality than video data obtained by the front camera 2a. Further, the controller 51 continues monitoring of the detection signal from the sound check unit 64.

During a period where image pickup may be performed at the rear priority rate, the controller 51 may detect the rate change condition at steps F218, F219, F220, F222 and F224. At step F218, the controller may monitor whether or not the user has performed the change operation to change the rate to the normal rate or the rate change instruction to change the rate to the normal rate has been received from the management station 40. At step F219, the controller may monitor whether or not the user has performed the change operation to change the rate to the front priority rate or the rate change instruction to change the rate to the front priority rate has been received from the management station 40. At step F220, the controller may discriminate whether or not the detection signal of a large sound volume in the front direction has been outputted from the sound check unit 64. At step F222, the controller may discriminate whether or not the detection signal of a large sound volume in the front direction has been outputted from the sound check unit 64. If yes, the controller 51 proceeds to step F223 where it may reset and restart a rear sound-volume timer. The rear sound-volume timer may count a duration or a period where the large sound volume in the rear direction may not be detected using the internal timer of the controller 51. At step F224, the controller may discriminate whether or not the duration where the large sound volume in the rear direction may not be detected is equivalent to a predetermined period. That is, whether the rear sound-volume timer has timed out. During the period where this detection may not be made, the controller 51 may return to step F217 where it may continue the image pickup operation at the rear priority rate.

At any of steps F209 and F218, if the change operation or the change instruction from the management station 40 to change the rate to the normal rate has been detected, the controller proceeds to step F201 where the controller 51 may change the rate to the normal rate. That is, the controller may set the frame rate and the compression rate for the storage encode unit 53a and the communication encode unit 54a, and the frame rate and the compression rate for the storage encode unit 53b and the communication encode unit 54b at equal rates.

At step F219, if the change operation or the change instruction from the management station 40 to change the rate to the front priority rate has been detected, the controller proceeds to step F208 where the controller 51 may change the rate to the front priority rate. At the normal rate, if a large sound volume in the front direction has been detected at step F204, the controller 51 may reset/start the front sound-volume timer at step F205 and then proceed to step F208 where it may change the rate to the front priority rate. Further, at the rear priority rate, if a large sound volume in the front direction has been detected at step F220, the controller 51 may reset/start the front sound-volume timer at step F221 and then proceed to step F208 where it may change the rate to the front priority rate. In this manner, if the rate may be changed to the front priority rate by detection of large sound volume in the front direction, a time-out at the front sound-volume timer may be detected at step F215.

If the front sound-volume timer has timed out, the controller 51 may proceed to step F216 to perform the rate change. For example, if a time-out status has been detected at step F215 after transition to the front priority rate by detection of the large sound volume in the front direction at step F204, the controller 51 may return to step F201 where the rate may be changed to the normal rate. In a case where time-out status has been detected after transition to the front priority rate by detection of the large sound volume in the front direction at step F220, the controller 51 returns to step F217 where the rate may be change to the rear priority rate. Further, after transition to the front priority rate by detection of the operation or instruction at steps F202 or F219, if the front sound-volume timer is started at step F214 and then the time-out status has been detected at step F215, the controller may return to step F208. That is, image pickup may continue at the front priority rate.

At the normal rate, if the large sound volume in the rear direction is detected at step F206, the controller 51 may reset/start the rear sound-volume timer at step F207 and then proceed to step F217 where it may change the rate to the rear priority rate. Further, at the front priority rate, if the large sound volume in the rear direction is detected at step F211, the controller 51 may reset/start the rear sound-volume timer at step F212 and then proceed to step F217 where it may change the rate to the rear priority rate. In this manner, if the rate is changed to the rear priority rate by detection of the large sound volume in the rear direction, a time-out status of the rear sound-volume timer may be detected at step F224.

If the rear sound-volume timer has timed out, the controller 51 may proceed to step F225 where it may perform the rate change. For example, if the time-out status has been detected at step S224 after detection of the large sound volume in the rear direction at step F206, the controller 51 may return to step F201 where the rate may be changed to the normal rate. If the time-out status has been detected at step F224 after detection of the large sound volume in the rear direction at step F211, the controller may return to step F208 where the rate may be changed to the front priority rate. Further, if the rear sound-volume timer may be started at step F223 by detection of the large sound volume in the rear direction at step F222 and then if the time-out status has been detected at step F224, after detection of the operation or instruction at steps F203 or F210, the controller may return to step F217. That is, the controller 51 may continue at the rear priority rate.

As described above, the controller 51 performs mode change control, with the user's operation or the rate change instruction from the management station 40 as the rate change condition. Further, upon detection of a large sound volume in the front direction as the rate change condition, the operation mode may be changed to the front priority rate from the normal rate or the rear priority rate by the controller 51. Further, upon detection of a large sound volume in the rear direction as the rate change condition, the operation mode may be changed to the rear priority rate from the normal rate or the front priority rate by the controller 51.

During patrol, a large sound volume may be an indication of an extraordinary status. For example, an alarm sound, an explosion, an accident, and/or a roar of anger, may be detected. As such, high-quality video data can be automatically obtained in the direction where the large volume sound has occurred. The obtained data may be recorded on the memory card 30 or transmitted to the management station 40. In particular, upon such extraordinary occurrence, the user may not have sufficient time to operate the video camera. However, video data rate may be automatically changed in the direction of occurrence of the large volume sound upon detection of the large sound volume. Accordingly, high quality video images may be recorded and/or transmitted corresponding to the extraordinary occurrence. Further, it may be advantageous in general purposes. For example, when great shouts of joy arise in an event, a high-quality video image can be obtained in the direction of the event.

During image pickup at the front priority rate or the rear priority rate, the rate may be returned to the normal rate in correspondence with the user's operation or the rate change instruction from the management station 40. The rate may be returned to the normal rate if the user or the operator in the management station 40 determines that recording/transmission of high-quality video image in the front or rear direction may not be necessary. In particular, if the large volume sound is not indicative of an extraordinary occurrence, the user or the operator in the management station 40 may determine that an extraordinary occurrence has not occurred. Therefore, the rate can be returned to the normal rate by the user's operation or an instruction from the management station 40.

Further, during image pickup at the front priority rate, if a large sound volume has not occurred in the front direction within a predetermined period, it may be not determined as an extraordinary occurrence, and, the rate may be returned to the initial rate status. Accordingly, it may not be necessary for the user to pay attention to the mode status automatically changed by detection of large sound volume.

Similarly, during image pickup at the rear priority rate, in a case where a large sound volume has not occurred in the rear direction within a predetermined period, the rate may be returned to the initial rate status. Accordingly, it may not be necessary for the user to pay attention to the mode status automatically changed by detection of large sound volume.

The predetermined time-out period may be a fixed value, may be arbitrarily set, or selected by the user. It may be arranged such that after transition to the front priority rate or the rear priority rate by detection of a large sound volume, processing to return the rate to the initial rate status in correspondence with the duration where a large sound volume may not be detected, may not be performed, or execution of the processing may be selectively set by the user.

In some environments, a large sound volume that may not be indicative of an extraordinary occurrence may be detected. Accordingly, the sound check unit 64 may analyze a sound signal by a frequency component, a level characteristic of each frequency, an attenuation pattern or the like. If the sound check unit 64 discriminates that the sound may be a particular sound, it may not generate a detection signal even though the sound has a large volume. For example, considering airport security, landing and takeoff sounds of airplanes may be detected as large sound volumes. However, if, for example, the frequency characteristics of the landing and takeoff sounds are previously set, it may be determined that an input sound may be the same or similar to the landing and takeoff sounds by signal analysis. As such, the large sound volume may not indicate an extraordinary occurrence and the rate may not be changed to the front priority rate or the rear priority rate.

Further, the threshold value for detection of a large sound volume may be a predetermined fixed value. However, the user may arbitrarily set a threshold level. For example, if the camera is used for security or the like in a noisy place, a large sound volume can be more accurately discriminated as an extraordinary status by setting the threshold value to a high level.

In the processing shown in FIG. 12, the sound volume level in the front or rear direction may be detected and the rate may be changed to the front priority rate or the rear priority rate. However, the rate may be changed to the front priority rate or the rear priority rate upon detection of a predetermined target sound rather than a large sound volume. That is, a frequency component of sound, a frequency characteristic, an attenuation pattern or the like may be set as a target sound in the sound check unit 64. Then, analysis may be performed on the frequency components, frequency characteristics, attenuation pattern of the input sounds from the microphones 3*a* and 3*b*, and it may be discriminated whether or not they correspond with or are similar to the target sound. Further, at that time, it may be discriminated whether the target sound has occurred in the front or rear direction, by using sound volume levels and delay time of the input sounds from the microphones 3*a* and 3*b*. Then, if it is discriminated that the target sound has been inputted from the front side, the sound check unit 64 may supply the detection signal to the controller 51. The controller 51 may change the rate to the front priority rate as the processing may proceed from step F204 to step F208 (or step F220 to step F208) as shown in FIG. 12. Further, if it is discriminated that the target sound has been inputted from the rear side, the sound check unit 64 may supply the detection signal to the controller 51. The controller 51 may change the rate to the rear priority rate as the processing may proceed from step F206 to step F217 (or step F211 to step F217) as shown in FIG. 12.

For example, an alarm sound, a vehicle collision, an explosion, and the like may be set as target sounds. When these sounds occur, recording/transmission of high-quality video data in a necessary direction can be performed at the front priority rate or the rear priority rate. Further, in a case where the sound check unit 64 may analyze a voice print and voice prints of a particular person or persons, if it is determined that the voice print of a person picked up by the video camera corresponds to a particular person, a high-quality video image in the direction of the person may be recorded/transmitted.

As an example of setting the target sound, the user may set the video camera in the target sound setting mode. The target sound may be inputted from the microphones 3*a* and 3*b* and the sound analysis performed by the sound check unit 64 may be recorded. Otherwise, alarm sound patterns, a collision sound or the like may be preset, and the user selects one of them as a target sound. Further, the management station 40 may transmit target sound data such as a particular alarm sound, a voice print of a wanted criminal and the like, and the controller 51 may receive such data and set it in the sound check unit 64.

6. Rate Change by Image Analysis

Next, the rate control performed by controller 51 with reference to FIG. 13 will now be described. During rate control, the controller 51 may discriminate the rate change condition from processing by the image analysis unit 63 and change the frame rate and the compression rate for the storage encode units 53*a* and 53*b*, and the communication encode units 54*a* and 54*b*, in correspondence with detection of the rate change condition. The image analysis unit 63 may perform image analysis on a video signal supplied from the front camera 2*a* and the rear camera 2*b* and check whether or not motion detection or input of target image has been made.

Regarding the motion detection, it can be detected whether or not motion has been found by comparing frames of a video signal sequentially inputted in a time-sequential direction.

Further, as to the target image, data may be previously set as a target image in the image analysis unit 63. A target image, for example, of a particular building, person or vehicle, a particular color or the like may be set. Then, processing to discriminate whether or not these target images are included in the input video signal may be performed by image analysis processing. The image analysis unit 63 supplies the detection signal to the controller 51 in correspondence with the detection of a predetermined motion status or target image. Further, at this time, the image analysis unit 63 may supply information on which camera caught the predetermined motion status or target image to the controller 51.

When setting a target image, the user sets the video camera to a target image setting mode. Then, a particular image may be obtained and the image analysis unit 63 may store the image. Otherwise, data regarding color, brightness, car model, building and the like may be preset as target images, and the user may select one of them as a target image. Further, the management station 40 may transmit data as target images such as, an image of a criminal, building, car model, particular color and the like, to the video camera, wherein the controller 51 may receive the data and set the data in the image analysis unit 63.

Figure 13:
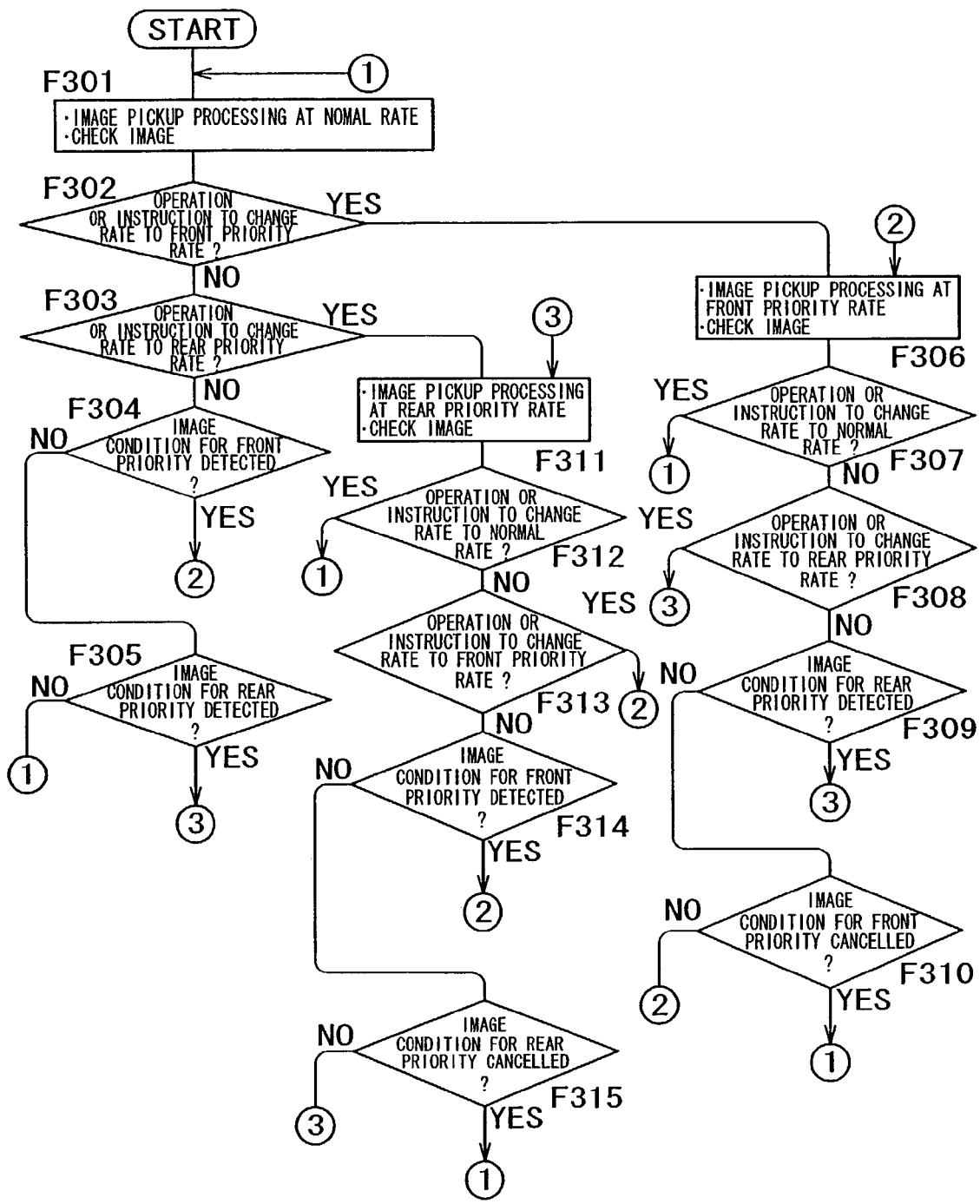
FIG. 13 is a flowchart of rate change processing based on an image analysis that may be preformed by the video camera of FIG. 1.

In FIG. 13, at the start of image pickup (recording/transmission), the controller 51 may instruct the respective encode units 53a, 53b, 54a and 54b to set the normal rate, as step F301. That is, the frame rate and the compression rate for the storage encode unit 53a and the communication encode unit 54a, and the frame rate and the compression rate for the storage encode unit 53b and the communication encode unit 54b, may be equal.

Further, the controller 51 may monitor the detection signal from the image analysis unit 63. In this case, the controller 51 may detect rate change conditions at steps F302, F303, F304 and F305. At step F302, the controller 51 may monitor whether or not the user has performed the change operation to change the rate to the front priority rate or the rate change instruction to change the rate to the front priority rate has been received from the management station 40. At step F303, the controller 51 may monitor whether or not the user has performed the change operation to change the rate to the rear priority rate or the rate change instruction to change the rate to the rear priority rate has been received from the management station 40. At step F304, the controller 51 may discriminate whether or not the image analysis unit 63 has detected the image condition in the front direction as the rate change condition (for example, the motion detection or detection of target image). At step F305, the controller 51 may discriminate whether or not the image analysis unit 63 has detected the image condition in the rear direction as the rate change condition (for example, the motion detection or detection of target image). If these rate change conditions are not detected, the controller returns to step F301 where it may continue the image pickup operation at the normal rate.

At step F302, if an operation or instruction to change the rate to the front priority rate is detected, the controller 51 proceeds to step F306 and performs image pickup (recording/transmission) at the front priority rate. That is, the frame rate and/or the compression rate for the storage encode unit 53a and the communication encode unit 54a may be higher than the frame rate and/or lower than the compression rate for the storage encode unit 53b and the communication encode unit 54b. As such, video data obtained by the front camera 2a may have a higher quality than video data obtained by the rear camera 2b. Further, the controller 51 may continue monitoring of the detection signal from the image analysis unit 63.

During a period where image pickup may be performed at the front priority rate, the controller 51 may detect the rate change condition at steps F307, F308, F309 and F310. At step F307, the controller 51 may monitor whether or not the user has performed the change operation to change the rate to the normal rate or the rate change instruction to change the rate to the normal rate has been received from the management station 40. At step F308, the controller 51 may monitor whether or not the user has performed the change operation to change the rate to the rear priority rate or the rate change instruction to change the rate to the rear priority rate has been received from the management station 40. At step F309, the controller 51 may discriminate whether or not the image analysis unit 63 has detected the motion detection or detection of a target image in the rear direction. At step F310, the controller 51 may discriminate whether or not the image condition for placing priority in the front direction has been cancelled. The determination of cancellation of image condition will be described later. If these rate change conditions are not detected, the controller 51 may return to step F306 where it may continue the image pickup operation at the front priority rate.

In the normal rate status as shown in F303, or in the front priority rate as shown in F308, if the controller detects an operation or instruction to change to the rear priority rate, the controller 51 may proceed to step F311, at which it performs image pickup (recording/transmission) at the rear priority rate. That is, the frame rate and/or the compression rate for the storage encode unit 53b and the communication encode unit 54b may be higher than the frame rate and/or lower than the compression rate for the storage encode unit 53a and the communication encode unit 54a. As such, video data obtained by the rear camera 2b, may have a higher quality than the video data obtained by image pickup by the front camera 2a. Further, the controller 51 may continue monitoring for the detection signal from the image analysis unit 63.

During a period where image pickup may be performed at the rear priority rate, the controller 51 may detect the rate change condition at steps F312, F313, F314 and F315. At step F312, the controller 51 may monitor whether or not the user has performed the change operation to change the rate to the normal rate or the rate change instruction to change the rate to the normal rate has been received from the management station 40. At step F313, the controller 51 may monitor whether or not the user has performed the change operation to change the rate to the front priority rate or the rate change instruction to change the rate to the front priority rate has been received from the management station 40. At step F314, the controller 51 may discriminate whether or not the image analysis unit 63 has detected the image condition in the front direction, i.e., motion detection or target image detection has been made in a video signal obtained by image pickup from the front camera 2a. At step F315, the controller 51 may discriminate whether or not the image condition to place priority in the rear direction has been canceled. If these rate control conditions are not detected, the controller 51 may return to step F311 where it may it continue the image pickup operation at the rear priority rate.

If the change operation to change the rate to the normal rate or the change instruction from the management station 40 has been detected at any of steps F307 and F312, the controller proceeds to step F301 where the controller 51 may change the rate to the normal rate. At step F313, if the change operation or the change instruction from the management station 40 to change the rate to the front priority rate has been detected, the controller proceeds to step F306 where the controller 51 may change the rate to the front priority rate. At the normal rate, as shown in step F304, or at the rear priority rate, as shown in step F314, if the image condition in the front direction has been detected, the controller 51 may proceed to step F306 and change the rate to the front priority rate. At the normal rate, as shown in step F305, or at the front priority rate, as shown in step F309, if the image condition in the rear direction has been detected, the controller 51 may proceed to step F311 and change the rate to the rear priority rate. At the front priority rate, as shown in step F310, if cancellation of the image condition with front priority has been detected, or, at the rear priority rate, as shown in step F315, if cancellation of the image condition with rear priority has been detected, the controller 51 may return to step F301 and change the rate to the normal rate.

According to the processing steps shown in FIG. 13, when a scene from which a high-quality video image should be obtained comes within an image pickup range (front or rear), the rate may be automatically changed such that the video image in the desired direction has a high image quality. For example, if a dynamic motion due to an attack by a thug or the like is detected, the scene in the direction in which the image of the thug or the like may be obtained by image pickup can be recorded and transmitted with high image quality. In this case, since the user may not have sufficient time for operation, the rate change to front/rear priority rate may be performed automatically.

For example, in response to surroundings of a heavily guarded building, a person (such as a wanted criminal), or the clothing or color thereof of a runaway criminal or the like, video data in the direction in which the image of the person are obtained may have high image quality. Accordingly, the control may be useful in security and inspection. Further, for general purposes, when a high-quality image is desired in a particular area, if a photograph of the place (building) or the like may be set as a target image, a desired image with high quality can be obtained by image pickup without the user's attention to the operation.

During image pickup at the front priority rate or the rear priority rate, the rate may be returned to the normal rate if the user or the operator in the management station 40 determines that high quality image pickup may not be necessary in the front or rear direction. Further, if it is determined that the image condition for front priority has been cancelled or if the image condition for rear priority has been cancelled, the rate may automatically return to the normal rate. Thereby, it may not be necessary for the user to pay attention to the rate status and the change operation.

The cancellation of an image condition may be determined by time counting. For example, in a case where the rate may be changed to the front priority rate by detection of an image condition in the front direction, if neither motion nor a target image is detected in the front direction within a continuous predetermined period, it can be determined that the image condition has been cancelled. In this case, the rate may not be simply returned to the normal rate but returned to the previous rate before the rate change occurred. The cancellation of an image condition for the rear priority rate can be determined in a similar manner.

Additionally, if a motion or target image has been detected in front and rear directions it may be determined that the image condition has been cancelled. That is, the determination may be that the image pickup should be performed in the front and rear directions with equal image quality.

7. Rate Change by Position Detection

Next, an example where the controller 51 may determine the rate change condition based on the current position information from the GPS decoder 65 and perform rate change will be described with reference to FIG. 14.

Figure 14:
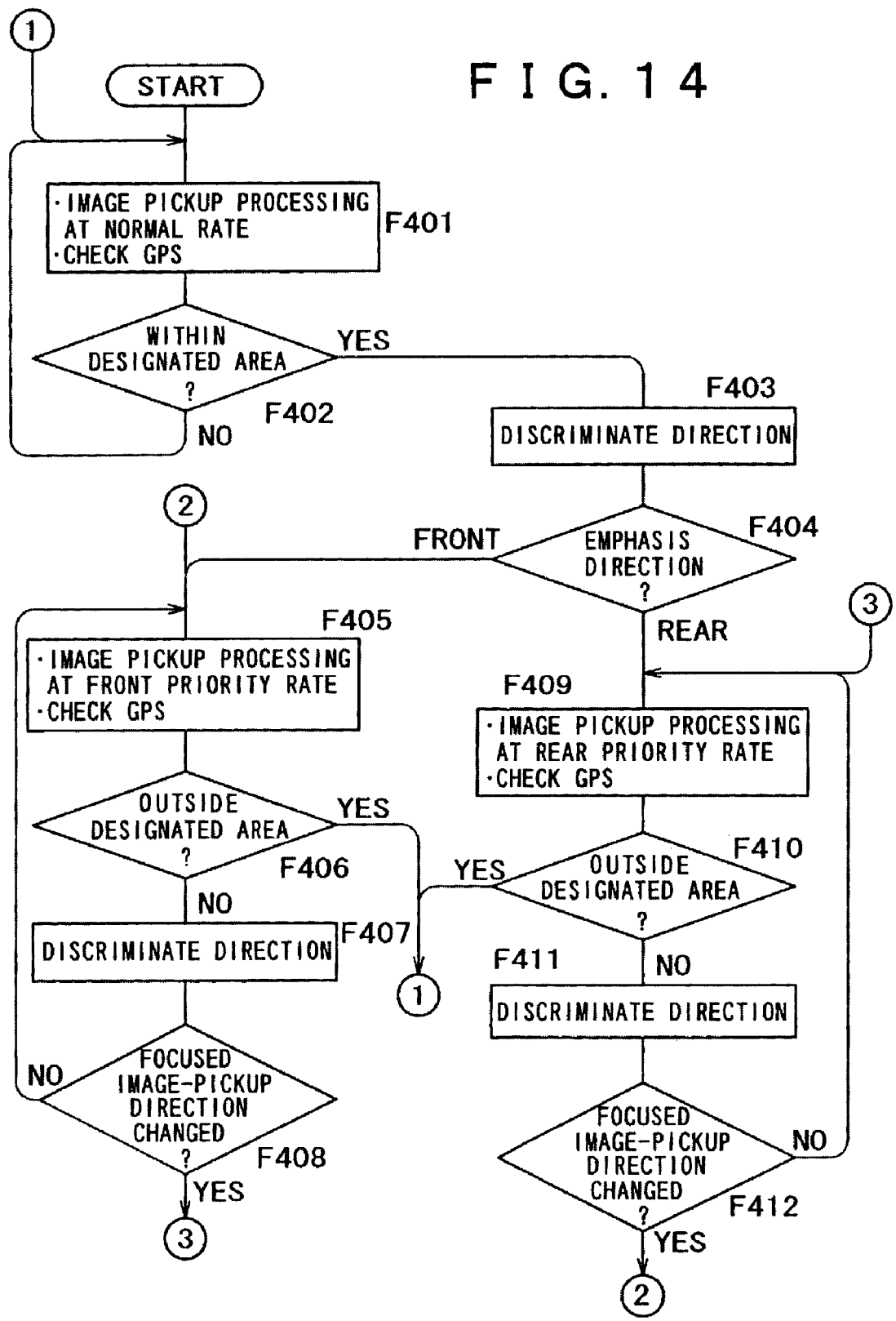
FIG. 14 is a flowchart of rate change processing based on detection of current position and detection of direction that may be preformed by the video camera of FIG. 1.

In FIG. 14, at the start of image pickup (recording/transmission), the controller 51 may instruct the respective encode units 53*a*, 53*b*, 54*a* and 54*b* to set the normal mode at step F401. In this case, information designating an area such as latitudinal range and longitudinal range information may be previously set as a criterion of determination. The controller 51 may compare the latitude and longitude of the current position information from the GPS decoder 65 with the above information of the designated area, and determine whether or not the current position may be within the designated area at step F402. During a period in which the current position may not be within the designated area, the controller 51 may continue the image pickup control at the normal rate.

Regarding the designated area information, for example, the user previously inputs a designated area by operating the video camera. Various input forms may be used, such as, a map may be displayed on the display unit 11 and the user can designate a range in the map. Alternatively, the user may input or select a place, thereby setting the latitude and longitude ranges in correspondence with the inputted or selected place as the designated area information. Further, the management station 40 may transmit data regarding the latitude and longitude ranges for the designated area to the video camera, wherein the controller 51 may receive it as the information on the designated area.

In the controller 51, a particular place, building, or the like may be set as a subject to be focused on during image pickup in the designated area. The designated area may be designated as an area name by the user or the management station 40. Further, a particular point (building or place) in the designated area may be set as a subject to be focused on during image pickup. Otherwise, the name of a particular building, street address or the like may be inputted. As such, it may be the subject to be focused on during image pickup while a peripheral area of the subject may be automatically set as a designated area.

At step F402, if the current position is determined to be within the designated area, the processing by the controller 51 may proceed from step F402 to F403, at which time, direction information from a direction detection unit 7 in the camera unit 1 may be checked. Then at step F404, it may be determined whether image pickup should be concentrated in the front direction or the rear direction. That is, it may be determined whether the camera directed to the direction of the subject to be focused on should be the front camera 2*a* or the rear camera 2*b*. If the camera is the front camera 2*a*, the process proceeds to step F405 wherein control may be performed such that image pickup (recording/transmission) may be performed at the front priority rate. That is, the frame rate and/or the compression rate for the storage encode unit 53*a* and the communication encode unit 54*a* may be higher than the frame rate and/or lower than the compression rate for the storage encode unit 53*b* and the communication encode unit 54*b*. As such, video data obtained by image pickup by the front camera 2*a* (which may be video data obtained in the direction of the subject to be focused on) has a higher quality than video data obtained by the rear camera 2*b*.

During a period in which the image pickup may be performed at the front priority rate, the controller 51 may compare the current position information with the information about the designated area. At step F406, the controller 51 may discriminate whether or not the current position is outside the designated area. If it is determined at step F406 that the current position is outside the designated area, the process proceeds to step F401, at which time, processing in the respective encode units 53a, 53b, 54a and 54b may be set at the normal rate. Further, if it is determined at step F406 that the current position is not outside the designated area, the direction information from the direction detection unit 7 may be checked at step F407. Then at step F408, it may be determined whether or not the camera directed to the direction of the subject is still the front camera 2a. If the camera is still the front camera 2a, the process returns to step F405, at which the status of front priority rate may be continued.

At step 404, if it is determined that the camera directed to the direction of the subject to be focused on during image pickup is the rear camera 2b, the process proceeds to step F409. At step F409, control may be performed such that image pickup (recording/transmission) may be performed at the rear priority rate. As such, video data obtained by the rear camera 2b (that is, video data obtained by image pickup in the direction of the subject to be focused on during image pickup) may have a higher quality than video data obtained by the front camera 2a.

During a period in which the image pickup may be performed at the rear priority rate, the controller 51 may compare the current position information with the information for the designated area. At step F410, the controller discriminates whether or not the current position is outside the designated area. If it is determined at step F410 that the current position is outside the designated area, the process proceeds to step F401, at which time, processing in the respective encode units 53a, 53b, 54a and 54b may be set at the normal rate. Further, if it is determined at step F410 that the current position is within the designated area, the direction information from the direction detection unit 7 may be checked at step F411. Then at step F412, it may be determined whether or not the camera directed to the direction of the subject is still the rear camera 2b. If the camera is still the rear camera 2b, the process returns to step F409 at which the rear priority rate may be continued.

At the front priority rate, if it is determined at step F408 that the camera directed to the direction of the subject to be focused on during image pickup has become the rear camera 2b, the process proceeds to step F409. At step F409 the rate may be changed to the rear priority rate. Further, if it is determined at step F412 that the camera directed to the direction of the subject to be focused in image pickup has become the front camera 2a, the process proceeds to step F405 where the rate may be changed to the front priority rate.

According to the processing shown in FIG. 14, recording/transmission of high-quality video data may be performed automatically for a video image directed to the direction of the subject to be focused on during image pickup. Accordingly, such processing may be desired where a heavily-guarded place is being patrolled or in other dangerous areas. Further, a particular place within the area may be monitored and/or the states recorded.

In the designated area, high-quality image pickup can always be performed for a subject to be focused on during image pickup by selecting in between the front priority rate and the rear priority rate in correspondence with direction discrimination. For general purposes, when a high-quality image pickup should be performed in a particular place in, for example, walking or hiking, if the location may be set as the subject to be focused on during image pickup, a desired image may be obtained without user's attention to the operation of the video camera.

Further, since the rate may be changed to the front priority rate or the rear priority rate in the designated area then the rate may return automatically to the normal rate in a position out of the designated area. It may be unnecessary for the user to be conscious of or pay attention to the rate operation, which may be preferable in security duty or the like.

8. Modification

Respective examples and or features have been described above as control processing for changing the frame rate and/or the compression rate. However, the present video camera is not so limited. In addition, various changes and/or other features may be employed.

In the processes previously described, image pickup may be started at the normal rate. However, image pickup may be initially performed at the front priority rate or the rear priority rate. Additionally, the rate change may be performed in accordance with a predetermined rate change condition.

Further, as previously described, the rate may be selected from three statuses: the normal rate, the front priority rate and the rear priority rate. However, the normal rate may be omitted and selection may be made between the front priority rate and the rear priority rate. In such case, initially an image pickup operation may be started at the front priority rate, and the rate may be changed to the rear priority rate in correspondence with a predetermined rate change condition. On the other hand, initially the image pickup operation may be started at the rear priority rate, and the rate may be changed to the front priority rate in correspondence with a predetermined rate change condition.

Further, at the front priority rate, for example, if the frame rate or the compression rate may be changed in a step-like manner, the quality of video data in the front direction can be improved in a step-like manner. That is, in the front priority rate, the rate change may be performed in plural steps. In this case, the rate to be controlled may be determined based on the status of a detection of plural rate change conditions or the number of detections, or the rate may be determined based on the detected rate change condition(s).

An example of rate change will be given under the assumption that a selection may be made between a first rate and second rate as the rate for a front video image within the front priority rate, and the second rate may be a rate at which an obtained image has quality higher than that at the first rate. At the normal rate or the rear priority rate, if one of the rate change conditions for the front priority rate is detected, the rate may be changed to the first rate of the front priority rate. Further, if one of the rate change conditions for the front priority rate is detected, the rate may be changed to the second rate. At the normal rate or the rear priority rate, if one of the rate change conditions for the front priority rate is detected, the rate may be changed to the first rate of the front priority rate. Further, at the normal rate or the rear priority rate, if the plural rate change conditions for the front priority rate are detected, the rate may be changed to the second rate of the front priority rate.

With regard to the rate change conditions for the front priority rate, when in the case of the user's operation and/or when a subject to be focused in image pickup is within a designated area and the like, the rate may be changed to the first rate of the front priority rate. In the case of detection of a large sound volume, detection of target sound, detection of image motion, detection of image target and the like, the rate may be changed to the second rate of the front priority rate. In this manner, the rate may be determined in correspondence with the type of detected rate change condition.

The present video camera is not limited to the processes described above. Rather, various other processes than the above examples can be performed. In the case of the rear priority rate, the rate change in plural steps like the above first rate and the second rate, can be performed in a similar manner. Further, as the rate change condition, the combination of the rate change conditions shown in the above respective examples can be employed. That is, the rate change conditions, the user's operation, the instruction from the management station 40, the detection of large sound volume, the detection of sound target, the detection of image motion, the detection of image target, and the direction of a subject to be focused in image pickup in a designated area and the like may be used. However, all or a part of these conditions may also be utilized.

Further, front and rear temperature sensors, an acceleration sensor and the like may be provided. The temperature statuses, acceleration status and the like may be detected as the rate change conditions for the front priority rate or the rear priority rate.

Upon detection of a shock by the shock sensor 67, the direction from which the shock has been applied may be detected. According to the detected direction the rate may be changed to the front priority rate or the rear priority rate.

Further, the respective rate change conditions may be weighted. For example, if a condition for the rear priority rate and a condition for the front priority rate overlapped with each other are detected, the front priority rate or the rear priority rate may be selected in accordance with which one may be a more important rate change condition.

Further, front and rear directions have been described where image pickup may be performed in the two directions. However, image pickup may be performed in more directions such as three directions or four directions. In such a case, control may be performed such that the compression rate and the frame rate in the respective corresponding encode units are changed in correspondence with the rate change conditions, that is, high-quality video data can be obtained in the direction in which image pickup may be performed to obtain the image of an important scene.

Further, in the above examples, the storage mode, the transmission mode and the multi mode are the operation modes. However, the operation mode may be automatically changed in correspondence with the detection of the rate change condition or another condition. For example, the multi mode or the transmission mode may be automatically set within a designated area such that video data may be transmitted to the management station 40 without fail. Further, when the memory capacity becomes small, the storage mode may be changed to the transmission mode or the multi mode. In addition, in the multi mode, when the battery capacity becomes equal to or less than a predetermined value, the mode may be changed to the transmission mode or the storage mode.

In the present video camera, frame processing to change the frame rate has been described as frame extraction processing. That is, the quality of the video image in the front direction may be different from that in the rear direction by the number of frames extracted from frame strings of video signals obtained from the CCD units 5a and 5b. However, the operations of the CCD units 5a and 5b themselves may be changed such that they have frame rates different from each other. For example, a CCD transfer clock to be supplied to the CCD unit 5a and a CCD transfer clock to be supplied to the CCD unit 5b can be variably controlled to different frequencies. In this frame processing, the frame rates for the front video data and the rear video data are variable.

Further, as processing subsequent to encoding for recording or encoding for communication, the frame rate may be set by performing frame thinning/frame interpolation, or the compression rate may be set by performing pixel thinning/pixel interpolation. Accordingly, the frame processing and the compression processing are not necessarily performed by the storage encode units 53a and 53b and the communication encode units 54a and 54b. Therefore, various apparatus constructions can be employed.

Further, the frame processing and the compression processing, for example, may be performed in plural steps. For example, two-step compression processing may be performed which includes first-step compression and second-step compression which is different from one-step compression.

As another example, at the front priority rate, only the first-step compression processing may be performed on a video signal obtained from the front camera 2a and the first-step compression processing and the second-step compression processing may be performed on a video signal obtained from the rear camera 2b. In this case, the rate (i.e., video quality) in the front video data may be different from that in the rear video data. Further, three or more steps may be used for compression processing. The compression processing in each step may be performed based on the same compression method or different compression methods. Similar processing may be performed regarding the frame rate.

As understood from the above description, according to the present invention, one or both of the compression rates in the compression processing and the frame rates in the frame processing in a video signal obtained in a first direction may be different from one or both of the compression rates in the compression processing and the frame rates in the frame processing in a video signal obtained in a second direction. That is, the quality of video data obtained by image pickup in the first direction can be different from that obtained by image pickup in the second direction.

Accordingly, appropriate recording/transmission of video data corresponding with the direction of a scene from which high-quality video data may be obtained may be realized. In particular, arranging the rate change conditions to be all or a part of the user's rate change operation, reception of a signal of the rate change instruction, a sound volume status equal to or greater than a predetermined value from one direction, a particular target sound from one direction, a predetermined motion status of image in one direction, a particular target image in one direction, and determination that the current position may be within a predetermined area (and direction), may permit a high-quality video image for a scene in an appropriate direction corresponding to the circumstance.

Further, this enables operation even in a situation where the user cannot perform the operation without difficulty. In other words, a video image in an appropriate direction corresponding to time and circumstance can be obtained with high quality without imposing a burden of image pickup operation on the user. This is very preferable in image pickup while other work may be performed, or for the purpose of cellular image pickup during patrol by a police officer or a security guard.

Further, for improved security or safety for the security guard, image pickup may be performed around the surroundings in a wide range such as front and rear directions, and high-quality image pickup may be performed in the direction of important scene.

Further, the rate change instruction may be sent from the image pickup management apparatus (management station) to the image pickup apparatus. This may help in taking command for security, grasping the situation and taking countermeasures to an emergency status. Further, as the rate change conditions such as the target image and the target sound can be set in the image pickup apparatus from the side of the image pickup management apparatus, image pickup can be preferably performed in correspondence with security and inspection purposes.

If the video signals in the first direction and the second direction subjected to the compression processing and/or the frame processing are recorded on a recording medium, a video image during patrol (for example a video image in the direction of scene which became important) can be stored with high image quality and can be utilized as inspection information, evidence and the like.

Further, as the video signals in the first direction and the second direction subjected to the compression processing and/or the frame processing are transmitted, a patrol video image can be monitored in the image pickup management apparatus (management station), or can be stored on a recording medium. Further, a video image in the direction of a scene which may be important can be monitored or stored with high image quality. This enables the management station to grasp the guarded situation, status of security, the place of incident and the like and take command, or improve safety for the user.

As the rate in the compression processing and/or the frame processing can be changed by the user's operation, high-quality image pickup can be performed in a direction corresponding to the user's convenience. Further, the rate can be changed by the signal of rate change instruction received by the communication means. High-quality image pickup can be performed in a desired direction in correspondence with the convenience of the image pickup management apparatus (management station) or other users (other security guards or the like). In particular, upon occurrence of a crime, the image pickup management apparatus may issue instructions to the image pickup apparatuses of respective security guards, police officers around the place of the crime, to reduce the compression rate and/or increase the frame rate in the frame processing for a video image in a necessary direction, so as to enable high-quality image pickup to be performed. This may be very effective for checking the situation and solution of the crime.

Further, the rate change may be performed in correspondence with detection of sound volume status equal to or greater than a predetermined value from one direction, a particular target sound from one direction, a predetermined motion status of an image in one direction, and a particular target image in one direction, and high-quality image pickup may be performed about a necessary direction. This may be appropriate as processing for an emergency.

Further, in a case where the current position may be within a predetermined area, as high-quality image pickup may be performed about a direction which may be a predetermined direction. The processing may be preferable especially for the purpose of high-quality image pickup mainly in a particular place such as a dangerous area and/or heavily-guarded area.

Further, the effects of use in security and police purposes have been described, however, it may be appropriate in general purposes to perform the rate change in correspondence with detection of sound volume status equal to or greater than a predetermined value from one direction, a particular target sound from one direction, a predetermined motion status of image in one direction, and a particular target image in one direction and designated area (and direction) and perform high-quality image pickup about a necessary direction. For example, when great shouts of joy arise, for example, in an event, a high-quality image pickup may be performed in the direction in which the great shouts of joy arose. The image of an important scene can be obtained with a high quality. Alternatively, in a designated area and direction, high-quality image pickup can be performed in a particular area. Thus, many opportunities may be able for the present invention.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

I claim:

1. An image pickup apparatus comprising:
  video signal generating means for generating video signals in a first direction and a second direction;
  signal processing means for changing a first direction frame rate of said video signals and for changing a second direction frame rate of said video signals;
  detection means for detecting that a state of the apparatus matches a predetermined condition for changing the first direction frame rate and the second direction frame rate of the video signals; and
  controlling means for controlling said signal processing means to change the first direction frame rate and the second direction frame rate as a function of said predetermined condition corresponding to the state of the apparatus detected by said detection means,
  wherein the predetermined condition indicates a mode in which the video signals are generated, wherein the mode the video signals are generated comprises:
    a normal mode wherein the first direction frame rate and the second direction frame rate are equal at a given time;
    a first direction priority mode wherein the first direction frame rate is higher than the second direction frame rate at a given time; and
    a second direction priority mode wherein the second direction frame rate is higher than the first direction frame rate at given time.

2. A signal processing apparatus for processing a video signal, said apparatus comprising:
  generating means, having bi-directional image pickup devices, for shooting scenes in a first direction and a second direction and for generating a first video signal and a second video signal respectively corresponding to the scenes of the first and second directions;
  compression means, connected to said generating means, for receiving said first and second video signals and for performing a compression process on said first and second source video signals with variable compression rates to generate a first compressed video signal and a second compressed video signal;
  transmitting means for transmitting said first and second compressed video signals with variable transmission rates;
  detecting means for detecting an event in a shooting position to generate a detection signal indicating at least a direction in which said event occurred; and
  controlling means for controlling the compression process on the first and second video signals and for controlling the transmission process of the first and second video signals as a function of the detection signal indicating the direction the event occurred,
  wherein, in response to the detection signal indicating a direction, the compression process switches from a normal mode wherein the first direction compression rate and the second direction compression rate are equal at a present time to either a first direction priority mode,
  wherein the first direction compression rate is decreased and the video signal from the first direction is of higher quality than that of the second direction;

or to a second direction priority mode wherein the second direction compression rate is decreased and the video signal from the second direction is of higher quality than that of the first direction.

3. An image pickup apparatus comprising:
video signal generating means for generating video signals for a plurality of directions;
signal processing means for changing a first direction frame rate, a second direction frame rate, a first direction compression rate and a second direction compression rate of said video signals;
detection means for detecting a predetermined condition; and
controlling means for controlling said signal processing means to change the first direction frame rate, the second direction frame rate, the first direction compression rate and the second direction compression rate as a function of the detected predetermined condition,
whereby said image pickup apparatus is intended to be mounted on an article of clothing worn by an operator,
wherein the predetermined condition indicates a mode in which the video signals are generated, wherein the mode the video signals are generated comprises:
a normal mode wherein a combination of the first direction frame rate, the second direction frame rate, the first direction compression rate, and the second direction compression rate result in a first direction video signal being of equal quality to a second direction video signal;
a first direction priority mode wherein the combination of the first direction frame rate, the second direction frame rate, the first direction compression rate, and the second direction compression rate result in the first direction video signal being of higher quality than the second direction video signal; and
a second direction priority mode wherein combination of the first direction frame rate, the second direction frame rate, the first direction compression rate, and the second direction compression rate result in the second direction video signal being of higher quality than first direction video signal.

4. The image pickup apparatus according to claim 3, further comprising a recording means for recording a first video signal and a second video signal on a recording medium.

5. The image pickup apparatus according to claim 3, further comprising communicating means for transmitting the first video signal and the second video signal.

6. The image pickup apparatus according to claim 3, further comprising an operating means for performing a rate switching operation, and wherein said predetermined condition is said rate switching operation.

7. The image pickup apparatus according to claim 3, further comprising communication means for receiving a rate switching instruction signal, and wherein said predetermined condition is said rate switching instruction.

8. The image pickup apparatus according to claim 3, further comprising:
sound pickup means capable of collecting sound and generating a sound signal; and
sound checking means for comparing said sound signal to a predetermined level,
wherein if said sound signal is equal to or exceeds said predetermined level, said sound signal is said predetermined condition.

9. The image pickup apparatus according to claim 8, further comprising direction detecting means for determining a direction from which the sound signal originated from.

10. The image pickup apparatus according to claim 3 further comprising:
sound pickup means capable of collecting sound in a first direction and a second direction and generating a first sound signal corresponding to said first direction and a second sound signal corresponding to said second direction; and
sound checking means for comparing said first sound signal and said second sound signal to a predetermined level,
wherein if said first sound signal or said second sound signal is equal to or exceeds said predetermined level, the respective sound signal is said predetermined condition.

11. The image pickup apparatus according to claim 10, further comprising direction detecting means for determining a direction from which the first sound signal and the second sound signal originated from.

12. The image pickup apparatus according to claim 3 further comprising:
sound pickup means capable of collecting sound and generating a sound signal; and
sound checking means for comparing said sound signal to a target sound,
wherein if said sound signal is similar to said target sound, said sound signal is said predetermined condition.

13. The image pickup apparatus according to claim 12 further comprising direction detecting means for determining a direction from which the sound signal originated from.

14. The image pickup apparatus according to claim 3 further comprising:
sound pickup means capable of collecting sound in a first direction and a second direction and generating a first sound signal corresponding to said first direction and a second sound signal corresponding to said second direction; and
sound checking means for comparing said first sound signal and said second sound signal to a target sound,
wherein if one of said first sound signal and said second sound signal is similar to said target sound, the respective sound signal is said predetermined condition.

15. The image pickup apparatus according to claim 14, further comprising direction detecting means for determining a direction from which the first sound signal and the second sound signal originated from.

16. The image pickup apparatus according to claim 3, further comprising image analyzing means for analyzing the video signals in a first direction and a second direction for detecting a target image, and wherein said detected target image is said predetermined condition.

17. The image pickup apparatus according to claim 3, further comprising image analyzing means for analyzing the video signals in a first direction and a second direction for detecting a predetermined motion, and
wherein said detected predetermined motion is said predetermined condition.

18. The image pickup apparatus according to claim 3, further comprising current position detecting means for determining a position of said image pickup apparatus.

19. The image pickup apparatus according to claim 3, further comprising emergency switching means for alerting a management station of an emergency.

20. The image pickup apparatus according to claim 19, wherein upon activation of said emergency switching means, said video signals and a location of said image pickup apparatus are transmitted to said management station.

21. A signal processing method for processing a video signal, said method comprising the steps of:
- capturing scenes in a first direction and a second direction and generating a first video signal and a second video signal respectively corresponding to the scenes of the first and second directions using a bi-directional image pickup device;
- detecting an event and generating a detection signal in response thereto;
- processing said first and second video signals so as to perform a compression operation in which said first and second video signals are processed with variable compression rates and a frame rate operation in which said first and second video signals are processed with variable frame rates so as to form first and second processed video signals;
- transmitting said first and second processed video signals; and
- controlling the appropriate one or ones of said variable compression rates and said variable frame rates in response to said detection signal,
- wherein the bi-directional image pickup device is intended to be mounted on an article of clothing worn by an operator,
- wherein the detection signal indicates a mode in which the video signals are generated,
- wherein the mode the video signals are generated comprises:
  - a normal mode wherein a combination of the first direction frame rate, the second direction frame rate, the first direction compression rate, and the second direction compression rate result in a first direction video signal being of equal quality to a second direction video signal;
  - a first direction priority mode wherein the combination of the first direction frame rate, the second direction frame rate, the first direction compression rate, and the second direction compression rate result in the first direction video signal being of higher quality than the second direction video signal; and
  - a second direction priority mode wherein combination of the first direction frame rate, the second direction frame rate, the first direction compression rate, and the second direction compression rate result in the second direction video signal being of higher quality than first direction video signal.

* * * * *